US008107527B1

(12) United States Patent
Hobbs et al.

(10) Patent No.: US 8,107,527 B1
(45) Date of Patent: Jan. 31, 2012

(54) PROGRESSIVE BLOCK ENCODING USING REGION ANALYSIS

(75) Inventors: David Victor Hobbs, Surrey (CA); Patrick Ratto, Burnaby (CA); Debra Dorey, legal representative, Burnaby (CA)

(73) Assignee: Teradici Corporation, Burnaby, British Columbia (CA)

( * ) Notice: Subject to any disclaimer, the term of this patent is extended or adjusted under 35 U.S.C. 154(b) by 1461 days.

(21) Appl. No.: 11/537,545

(22) Filed: Sep. 29, 2006

Related U.S. Application Data

(63) Continuation-in-part of application No. 11/333,955, filed on Jan. 17, 2006, now Pat. No. 7,747,086, application No. 11/537,545, filed on Sep. 29, 2006, which is a continuation-in-part of application No. 11/532,865, filed on Sep. 18, 2006, now Pat. No. 7,822,278.

(60) Provisional application No. 60/703,767, filed on Jul. 28, 2005, provisional application No. 60/719,050, filed on Sep. 20, 2005, provisional application No. 60/726,418, filed on Oct. 12, 2005.

(51) Int. Cl.
*H04N 7/12* (2006.01)
(52) U.S. Cl. ........... 375/240.01; 375/240.02; 375/240.2; 375/240.21
(58) Field of Classification Search ............. 375/240.01, 375/240.02, 240.2, 240.21
See application file for complete search history.

(56) References Cited

U.S. PATENT DOCUMENTS

| | | | |
|---|---|---|---|
| 4,984,076 A | | 1/1991 | Watanabe et al. |
| 5,157,491 A | | 10/1992 | Kassatly |
| 5,263,100 A | | 11/1993 | Kim et al. |
| 5,473,366 A | | 12/1995 | Imaeda et al. |
| 5,568,200 A | * | 10/1996 | Pearlstein et al. ....... 375/240.27 |
| 5,583,573 A | | 12/1996 | Asamura et al. |
| 5,767,978 A | | 6/1998 | Revankar et al. |
| 5,945,933 A | | 8/1999 | Kalkstein |
| 5,990,852 A | | 11/1999 | Szamrej |
| 6,664,969 B1 | | 12/2003 | Emerson et al. |
| 6,701,380 B2 | | 3/2004 | Schneider et al. |
| 6,760,482 B1 | | 7/2004 | Taubman |
| 6,915,027 B2 | | 7/2005 | Ali |

(Continued)

OTHER PUBLICATIONS

AL-Turkistany et al., "Intelligent Adaptation Framework for Wireless Thin-Client Environments," Proceedings of the International Conference on Computing, Communications and Control Technologies: CCCT'04, Aug. 2004, 12 pages, Austin, Texas.

(Continued)

*Primary Examiner* — Jayanti K Patel
*Assistant Examiner* — Geepy Pe
(74) *Attorney, Agent, or Firm* — Moser Taboada

(57) ABSTRACT

The present invention provides a method of progressively encoding and transmitting visual data. First image information updates are acquired for a region of visual data. The region of visual data is defined by a plurality of blocks of pixel data, and individual blocks of the plurality are associated with individual change histories for their respective pixel data. Stored region information including a recent encoded state for each block in the plurality is retrieved. Available network bandwidth is determined, and then encoding parameters for each block in the region of visual data are determined from the retrieved region information and the available network bandwidth. The plurality of blocks is then encoded, the retrieved region information is updated in accordance with the determined encoding parameters; and the encoded blocks are transmitted across a computer network.

35 Claims, 16 Drawing Sheets

U.S. PATENT DOCUMENTS

| | | | |
|---|---|---|---|
| 7,024,045 | B2 | 4/2006 | McIntyre |
| 7,084,837 | B2 | 8/2006 | Sotoda et al. |
| 7,430,219 | B2 | 9/2008 | Itoh et al. |
| 2002/0054044 | A1 | 5/2002 | Lu et al. |
| 2003/0126443 | A1 | 7/2003 | Wakeo |
| 2003/0177172 | A1 | 9/2003 | Duursma et al. |
| 2003/0189574 | A1 | 10/2003 | Ramsey |
| 2003/0191860 | A1 | 10/2003 | Gadepalli et al. |
| 2003/0212811 | A1 | 11/2003 | Thornton |
| 2004/0008205 | A1 | 1/2004 | O'Neill et al. |
| 2004/0008213 | A1 | 1/2004 | O'Neill et al. |
| 2004/0008214 | A1 | 1/2004 | O'Neill et al. |
| 2004/0010622 | A1 | 1/2004 | O'Neill et al. |
| 2004/0062305 | A1 | 4/2004 | Dambrackas |
| 2005/0025234 | A1 | 2/2005 | Kato et al. |
| 2005/0122397 | A1* | 6/2005 | Henson et al. ............ 348/143 |
| 2005/0166050 | A1 | 7/2005 | Kosaki |
| 2006/0233201 | A1 | 10/2006 | Wiesenthal |
| 2007/0076639 | A1 | 4/2007 | Chou |

OTHER PUBLICATIONS

Gilbert, Jeffrey Michael, "Text / Graphics and Image Transmission over Bandlimited Lossy Links", A thesis submitted in partial satisfaction of the requirements for the degree of Doctor of Philosophy in Engineering Electrical Engineering and Computer Sciences in the Graduate Division of the University of California, Berkeley, Spring 2000, 276 pages, Berkeley, CA, USA.

Hsu, Hui-Huang et al., "Adaptive Image Transmission by Strategic Decomposition", Proceedings of the 18th International Conference on Advanced Information Networking and Application (AINA'04), 6 pages.

Liang, Shin Tsung et al., "Design and Modeling of the Generally Adopted Progressive Image Transmission Regulator and its Application", Proceedings 2001 International Conference on Image Processing in Thessaloniki, Greece, Oct. 7-Oct. 10, 2001, vol. 1, pp. 90-93, IEEE, New York, NY, USA.

Liu, Zhen et al., "JPEG2000 Encoding With Perceptual Distortion Control", IEEE Transactions on Image Processing, Jul. 2006, vol. 15, No. 7, pp. 1763-1778, IEEE, New York, NY, USA.

Raman, Suchitra et al.,"An Image Tansport Protocol for the Internet", submitted to International Conf. on Netwrok Protocols 2000, published in IEEE/ACM Transactions on Networking, Jun. 2002, vol. 10, No. 3, pp. 297-307,15 pages, joint publication of IEEE and Association Computer Machinery, New York, NY, USA.

Rauschenbach, Uwe et al., "Flexible Embedded Image Communication using Levels of Detail and Regions of Interest", Proceedings IMC '98—Interactive Applications of Mobile Computing in Rostock, Germany, Nov. 24-25, 1998, 10 pages.

Office Action for co-pending U.S. Appl. No. 11/532,865, mail date Feb. 19, 2010, entitled "Methods and Apparatus for Encoding a Digital Video Signal", David Victor Hobbs, filed Sep. 18, 2006, 21 pages.

Buck, Ian, Humphreys, Greg, and Hanrahan, Pat, "Tracking Graphics State for Networked Rendering," Proceedings of SIGGRAPH/Eurographics Workshop on Graphics Hardware, Aug. 2000, 9 pages, ACM Press, New York, N.Y. U.S.A.

Humphreys, Greg and Hanrahan, Pat, "A Distributed Graphics System for Large Tiled Displays," Proceedings IEEE Visualization '99, 9 pages, 1999.

Nieh, Jason, Yang, S. Jae, and Novik, Naomi et al., "A Comparison of Thin-Client Computing Architectures," Technical Report CUCS-022-00, Network Computing Laboratory, Columbia University, Nov. 2000, 16 pages.

"OpenGL Vizserver™3.1 Application-Transparent Remote Interactive Visualization and Collaboration", White Paper, Silicon Graphics Inc., 2003, 15 pages.

Stegmaier, Simon, Magallon, Marcelo, and Ertl, Thomas, A Generic Solution for Hardware-Accelerated Remote Visualization, Joint Eurographics—IEEE TCVG Symposium on Visualization, 2002, pp. 87-94, vol. 22, Eurographics Association, Aire-la-Ville, Switzerland.

US Non-Final Office Action mailed Jun. 4, 2008 for U.S. Appl. No. 11/549,055, filed Oct. 12, 2006.

U.S. Office Action mailed Apr. 14, 2009 for U.S. Appl. No. 11/333,955, filed Jan. 17, 2006.

U.S. Appl. No. 11/173,817, filed Jun. 30, 2005.

Kamath, S. et al., "Low-Bit Rate Motion JPEG Using Differential Encoding," 38th Asilomar Conference on Signals Systems and Computers, Nov. 2004, vol. 2, pp. 1723-1726, IEEE, New York, NY, USA.

Zhao, L. et al., "Constant Quality Rate Control for Streaming MPEG-4-FGS Video." In Proceedings of IEEE International Symposium on Circuits and Systems (ISCAS), 2002, pp. 544-547, IEEE, New York, NY, USA.

Turner, Charles J. et al., "Image Transfer: An End-to-End Design," SIGCOMM '92, Proceedings of the Conference on Communications Architecture & Protocols, Aug. 17-20, 1992, pp. 258-268, held in Baltimore, Maryland, USA. ACM Press, USA.

* cited by examiner

Progressive Encoding System

Block Encoder

FIG. 6

| | | Blocks at Present Quality | Desired Coding Quality Level | | | | | | |
|---|---|---|---|---|---|---|---|---|---|
| | | | 0 | 1 | 2 | 3 | 4 | 5 | 6 |
| Present Coding Quality Level | 0 | $k_0$ | 0 | $a_{01}$ | $a_{12}$ | $a_{23}$ | $a_{34}$ | $a_{45}$ | $a_{56}$ |
| | 1 | $k_1$ | | | | | | | |
| | 2 | $k_2$ | | | | | | | |
| | 3 | $k_3$ | | 0 | | | | | |
| | 4 | $k_4$ | | | 0 | | | | |
| | 5 | $k_5$ | | | | 0 | 0 | | |
| | 6 | $k_6$ | | | | | | 0 | 0 |
| | | Total K | | $B_1$ | $B_2$ | $B_3$ | $B_4$ | $B_5$ | $B_6$ |

602 → Blocks at Present Quality
604 → Desired Coding Quality Level
600 (table)
610 → Total K
612 → $B_1$

PROGRESSIVE BLOCK ENCODING USING REGION ANALYSIS

RELATED APPLICATIONS

This application is a Continuation-in-Part of co-pending U.S. patent application Ser. No. 11/333,955, filed Jan. 17, 2006, which claims the benefit of U.S. Provisional Patent Application Ser. No. 60/703,767, filed Jul. 28, 2005, and this application is a Continuation-in-Part of co-pending U.S. patent application Ser. No. 11/532,865, filed Sep. 18, 2006, which claims the benefit of U.S. Provisional Patent Application Ser. No. 60/719,050, filed Sep. 20, 2005, and this application claims priority to U.S. Provisional Patent Application Ser. No. 60/726,418, filed Oct. 12, 2005.

FIELD

The invention relates generally to methods for encoding graphics signals for communication across a transmission medium. More particularity, the invention relates to methods for encoding persistent regions of a computer display image for progressive transmission to a remote user interface.

BACKGROUND

There is a growing desire in many workplace and other environments to separate the display of a computer system from the application processing parts. In the desired configuration, the display is physically located at the user's desktop, while the processing components of the computer are placed in a central location. The display is then connected to the data processor with some method of communication. Various methods described below attempt to address the significant challenge of transferring a high image bandwidth display content from a centralized data processor across a standard network to a remote display with limited network bandwidth. The simplest method is to periodically send copies of frame buffer information from the data processor. This is impractical for sending a normal resolution display image at a reasonable refresh rate. For example, an image frame of 1280×1024 at 24-bit resolution would take 0.3 seconds of dedicated 100 Base T LAN network bandwidth, making perception-free communications of display information with update rates upwards of 30 frame per second impossible.

An alternative approach is to intercept graphics instructions on the data processor and communicate these across the network. However, this method is intrusive on the host system that requires operating system dependent graphic command routing software. Moreover, a processor and software capable of interpreting the graphics commands is required at the remote user interface which makes the method restrictive in its broad compatibility, adds cost and increases complexity to the remote installation.

In another approach, the data processor compares the previously transferred frame with the current frame and only transfer changes between them. The overall amount of data is thereby decreased, especially in the case of a computer display in which much of the display may be static from frame to frame. However, this approach is expensive to implement because the data processor requires at least two frame buffers. A first frame buffer contains a copy of the previously communicated frame and a second contains the present frame. Given that the previous frame must be compared with the present frame one pixel at a time, an additional temporary delta-buffer, is often requiring this approach is both memory and computationally intensive. There is a noticeable decrease in the performance of applications running on the data processor, especially during applications such as video clips that involve significant screen refresh activity. This is caused by each screen refresh requiring the movement and copying of graphics information between frame buffers across the local system bus of the data processor.

A variation of the frame comparison method reduces the overall data processor memory requirement by segmenting the frame buffer into tiles and maintaining a list of signatures for the tiles. The new frame is tiled and the signature for each new tile is compared with the signature in the list to determine if the tile should be transferred. These tiling and list methods are limited. They require hardware or application-based frame buffers tightly-coupled with the data processing architecture. The copying of pixels and signatures that loads the system bus impacts system performance. Software approaches interrupt the operating system so that background tasks can manage the activity. This further reduces the performance of the data processor. Existing tiled change detect methods are also limited in sophistication. Typically, an operation is only performed when the image has changed, in which case the operation is to send the new image More general image and video compression methods for transferring computer display images to a remote display are even less suitable. With respect to still image transfer methods, simple progressive image transmission (PIT) methods enable the transmission of still image files across a network. For example, progressive encoding is a standard feature of the JPEG2000 specification and enables the pre-encoding of an image file such that the transfer and display of a reasonable quality image approximation at the client side of the network is prioritized by first displaying the low spatial frequency components of the image, followed by a progressive build to the display of a lossless image over a series of build frames. The advantage of using a PIT method is that the peak bandwidth for the image transfer is lower compared with sending the whole image in a single frame. One shortcoming associated with the non-adaptive nature of many PIT methods is overcome by a variation on simple PIT, termed a "generally adopted PIT regulator" (GAPIT-R). GAPIT-R checks network availability and then encodes and transmits an optimum number of bit planes based on available bandwidth. However, PIT methods are not suitable for computer display applications. One major shortcoming lies in the lack of explicit support for the compound nature of a computer display image comprised of text, pictures, background and high definition icon types, each which has different quality requirements. Another major shortcoming lies in the lack of any encoding efficiencies gained by taking advantage of possible inter-frame commonality of content from one frame update to the next.

Video transmission methods on the other hand are tailored to the transmission of highly dynamic images at fixed frame rates and limited bandwidth. They are relatively insensitive to encode/decode delays and typically use encoding methods unrelated to this discussion. Hybrid variations such as M-JPEG transmit a series of independent JPEG images without applying inter-frame prediction methods typical of other video encoding methods such as MPEG-2, H.264 and others. Consequently, these offer limited compression and tend to consume high network bandwidth, especially in applications that mandate high frame rates. Therefore they remain best suited to specialized applications like broadcast resolution video editing or surveillance systems where the frame rate is low.

In summary, existing still image and video compression techniques are not optimized for the high-quality and low latency encoding requirements of dynamic computer display images. Other methods developed specifically to transfer computer display images require intrusive components or a complex remote display system. This results in higher equipment and maintenance costs and lower performance. Therefore, opportunities remain for a significant improvement in computer display image transfer methods.

SUMMARY

The objective of the invention is to encode dynamic computer display images that optimize perceptual quality in terms of update latency and coded image quality in response to varying and limited available bandwidth.

In one aspect, a method for updating a region that maximizes the quality of the region using the available bandwidth is described. Unlike alternative methods that incrementally encode bit planes independent of available bandwidth, the described method maximizes quality based on an analysis of present quality, desired quality and available bandwidth.

In another aspect, a method for updating an image area based on its desired quality compared to the desired quality of other areas in the image is presented. Unlike other progressive image transfer methods that optimize static images, the described method is optimized for transferring a dynamic image in which different areas are changing at different times.

In another aspect, a method for systematically improving the quality of image areas that change or drop in perceived quality is presented. This maximizes the perceptual experience of a user by ensuring that all regions of an image remain current even during times of frequent content changes in different regions.

In another aspect, a method for ensuring a minimum quality level for a dynamic image is presented. Blocks that have achieved a defined minimum quality are held constant if the is insufficient network bandwidth to bring blocks of a lower quality level to a minimum quality level. Unlike other progressive image transmission techniques that use region-of-interest analysis to prioritize pre-defined areas, the described method is able to dynamically prioritize the transmission of changed areas over perceptually acceptable static areas.

The present invention provides a method, apparatus, and computer readable medium for progressively encoding and transmitting visual data. First image information updates are acquired for a region of visual data. The region of visual data is defined by a plurality of blocks of pixel data, and individual blocks of the plurality are associated with individual change histories for their respective pixel data. Stored region information including a recent encoded state for each block in the plurality is retrieved. Available network bandwidth is determined, and then encoding parameters for each block in the region of visual data are determined from the retrieved region information and the available network bandwidth. The plurality of blocks is then encoded, the retrieved region information is updated in accordance with the determined encoding parameters; and the encoded blocks are transmitted across a computer network.

In an embodiment, the stored region information is embodied as an image history for the region. The image history also may embody an initialized encoding state for at least one block in the plurality. The image history may also embody a history of encoding at least one block in the plurality since pixel data in the at least one block was changed. The image history may embody an indication of a number of frames that have been acquired since the most recent encoding, or a record of the time since the most recent encoding. Also, the image history may embody information describing image types contained within blocks in the plurality, such as text, picture, background, video and object types. In an embodiment, the recent encoded state may include the most recent progressive encoded state for the block.

In various embodiments, acquiring image information updates may include acquiring pixel updates or image type information for a block. In an embodiment, determining encoding parameters may embody determining block encoding requirements, such as incremental progressive encoding steps. Similarly, the block encoding requirements may embody an initial encoding quality level, or determining how a block is to be encoded.

In an embodiment, determining the encoding quality level may embody determining a maximum encoding quality increment that can be achieved within the available network bandwidth.

In summary, the progressive image transmission methods described offer various benefits over other image transmission methods aimed at improving the perceptual experience of users of remote computer display and other image transfer systems.

Many other features and advantages of the present invention will be apparent from reading the following detailed description, when considered in conjunction with the accompanying drawings, in which:

BRIEF DESCRIPTION OF THE DRAWINGS

FIG. 6 shows an embodiment of a region summary and analysis table;

DETAILED DESCRIPTION

The invention is well suited to the encoding of bit-exact image sequences, where high perceptual quality is important. One example is a computer display image encoding application.

Figure 1:
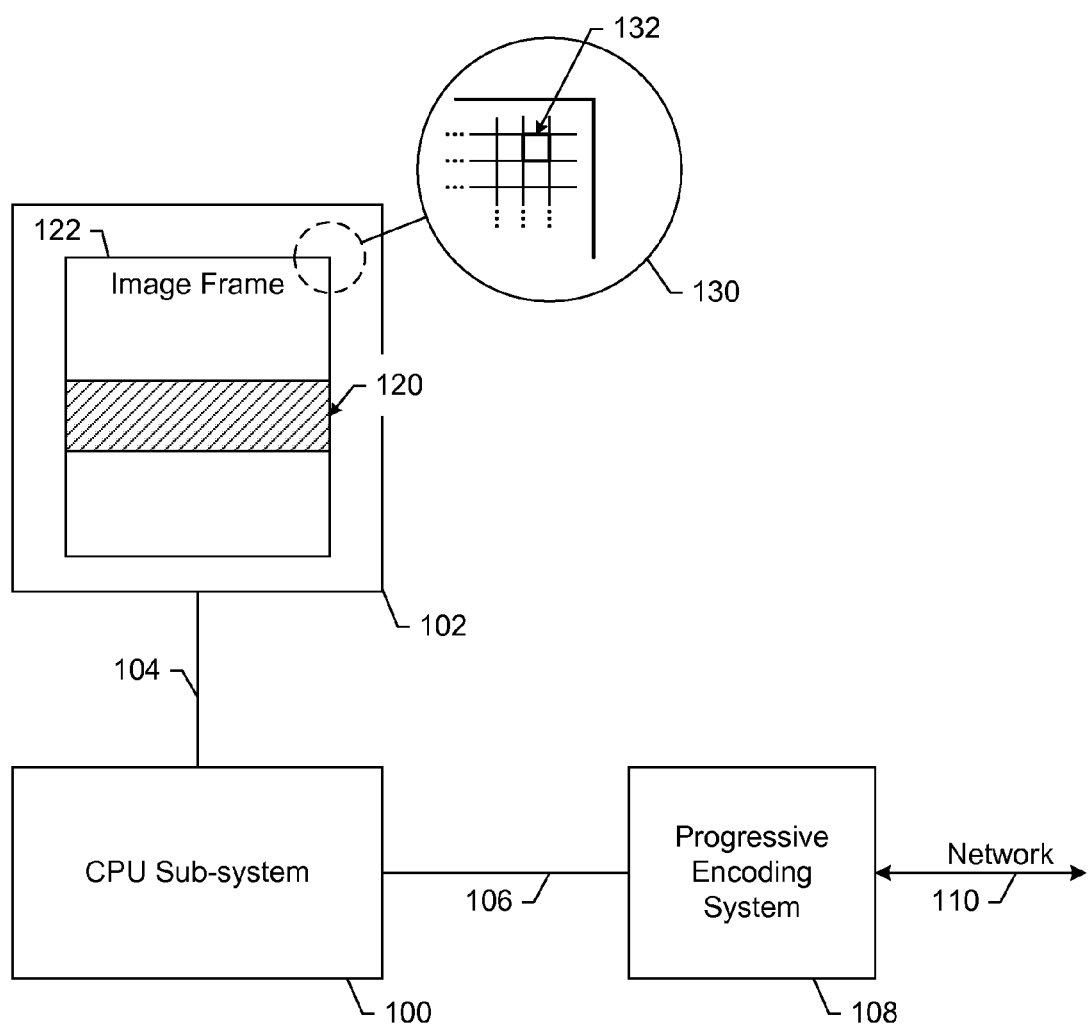
FIG. 1 shows a progressive encoding system connected to an image transfer bus of a CPU sub-system as may be used for the encoding of a computer display image stream.

FIG. 1 shows a progressive encoding system connected to an image transfer bus of a CPU sub-system as may be used for the encoding of a computer display image stream. An embodiment of an associated remote system is described below and illustrated in FIG. 4. Standard CPU sub-system 100 includes one or more processors, a chipset and optional GPU. Standard CPU sub-system 100 connects to memory sub-system 102 using memory bus 104. Memory 102 stores a pixel map image.

In one embodiment, standard CPU sub-system 100 transmits the image as a display signal across image transfer bus 106 to progressive encoding system 108 where the image is processed using methods described below. Digital raster embodiments of image transfer bus 106 include Digital Visual Interface (DVI), Digital Packet Video Link (DPVL), DisplayPort, Unified Display Interface (UDI) and other digital raster formats. A VGA embodiment of image transfer bus 106 is also feasible in applications where a limited resolution is acceptable. In an alternative embodiment, bus 106 also communicates additional information such as image type information and bandwidth availability information to system 108.

In another embodiment, progressive encoding system 108 systematically reads the image. In this case, progressive encoding system 108 accesses memory sub-system 102 using hardware or software-based screen scraping methods may be tightly integrated with CPU sub-system 100. One example of a tightly integrated system is a software method where progressive encoding system 108 is a software application running on CPU sub-system 100.

Progressive encoding system 108 is connected to network 110 where network 110 is a computer network such as a corporate LAN. Packets containing encoded image information are transferred to a remote decoding and display system across network 110.

In the present embodiment, image transfer bus 106 communicates a display image stream comprised of an ongoing sequence of image frames and progressive encoding system 108 takes a regional approach to encoding the image stream. In the embodiment, an image region (shown as shaded region 120) is a "slice" across image frame 122 where frame 122 comprises a defined number of sequential rows of a raster. Alternatively, a region may be an entire frame. A single frame may also have different defined regions of different shapes. However, image region 120 should remain at a constant position from frame to frame so that precisely identified areas may be encoded using the progressive encoding methods described herein. Region 120 is further divided into a set blocks as shown in insert 130 where image block 132 is identified as a typical block. A block defines a unit area for tracking an image and each block is comprised of 8×8 pixels but other embodiments are feasible. By operating at a block level compared to a pixel level, the number of system parameters in progressive encoding system 108 is reduced and multiple pixels may be combined and encoded together using transform encoding techniques such as DCT coding. Progressive encoding methods may be implemented by defining a block structure for the progressive encoding phase that is physically aligned with the grid structure of a block-transformed image resulting from the transform phase. Alternative embodiment uses smaller block sizes, for example a single pixel, but this requires transform encoding to be managed across multiple blocks.

Pixels of the same pixel type in an image block that change at the same time are managed as a single entity using masks to identify pixels included in a set. In one embodiment pixels are pre-classified as having an identified pixel type such as video, text, picture, or background type using standard image decomposition methods. In the embodiment, all block in a region may be subject to the same progressive encoding sequence but individual blocks may be at different states of progression as a result of pixels changing at different times. In an alternative embodiment, blocks in a region may be subject to different progressive encoding sequences based on image type. In such a case, different progressive sequences may be executing simultaneously and different blocks may be at different states of progression within each sequence method. As an example, a region may be classified as having two picture areas (e.g. JPEG pictures) changing at different times, a text area (e.g. Display of a word processing screen) and a video sequence (e.g. An MPEG clip). In this example, blocks classified as text might be assigned a high priority rapid build sequence to lossless coding quality level, all blocks classified as pictures might be subjected to a slow progression to a high coding quality using a different sequence and blocks classified as video might be subjected to a rapid progression to a lower coding quality level to limit the bandwidth consumed by video. Note that this specification uses the term "coding quality level" to define a numerical value used to set a measurable image quality level at the decoded output of a progressive encoding system.

Many of the advantages of individual pixel state management are gained by using block masks to group pixels and overheads of transmitting and storing the individual pixel information are avoided.

Figure 2:
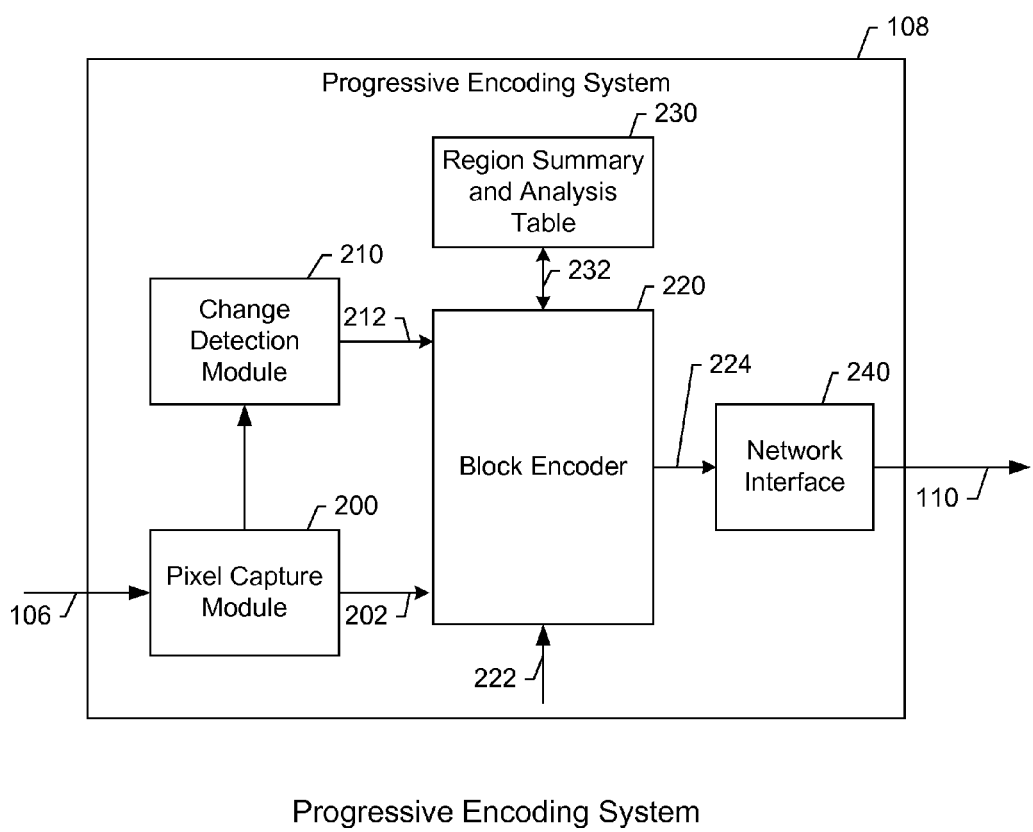
FIG. 2 is a diagram of a progressive encoding system used to encode blocks based on regional progressive encoding priorities.

FIG. 2 is a diagram of system 108 in FIG. 1 used to encode blocks based on regional progressive encoding priorities prior to transmission across network 110. In the embodiment shown, pixel capture module 200 receives an incoming display signal on bus 106. Module 200 forwards the pixels to change detection module 210 and block encoder 220. Module 210 detects changes to image block (ref. Block 132 in FIG. 1) using any efficient pixel block detection method. In one embodiment, module 210 calculates hash codes for 8×8 pixel blocks, which is a convenient dimension for discrete cosine transformation calculations. The hashing function calculates a partial hash code for a horizontal raster line sequence of 8 incoming pixels from pixel capture module 200 (i.e. the hashing function is repeatedly executed and a new partial value generated as each pixel is received). Starting with the first line in a horizontal scan, a partial hash code is calculated for the first 8 pixels in the line. Once the partial code has been calculated, it is stored in a local memory buffer and the hashing function calculates and stores a new partial code for the next 8 pixels in the line. This sequence is repeated until the end of the line of pixels in the scan. When the second scan line is initiated, the partial hash code for the first 8 pixels of the first line is retrieved from the memory buffer and the code is updated to include the first 8 pixels in the new line directly below the first line. This sequence is repeated for the rest of the second line and for all 8 lines. Once a hash code has been calculated for an 8×8 block of pixels, the code is compared with a hash code for the same block the previous image frame. A persistent image block is detected if a recent hash code is the same as a previous hash code. If the hash codes differ, module 200 signals encoder 220 to initialize a progressive build state for the current block using change detection signal 212.

Module 210 may also incorporate circuitry or embedded software functionality to identify additional image attributes. In one embodiment, module 210 includes standard image decomposition filters capable of identifying different static properties including image types such as backgrounds, pictures, icons or text. In this case, image type attributes are also forwarded to encoder 220. In another embodiment, module 210 includes a function that analyses block change frequency in order to identify if the block includes a video sequence. In a case where a block is identified as changing at an anticipated video frame refresh rate (e.g. 30 frames per second), module 210 uses signal 212 to update encoder 220 with this additional block information. In another embodiment, graphic commands executing on sub-system 100 (ref. FIG. 1) that generate the image are monitored for information that describes image type (e.g. Video sequences, photographs, text etc.). These image type indicators are then forwarded over connection 106 to system 108.

Module 200 also forwards incoming digitized display data to encoder 220 over pixel bus 202. Encoder 220, described in detail below and illustrated in FIG. 3, buffers regions of image blocks and uses region summary and analysis table 230 to determine encoding priorities for each block in a region. Table 230 is a memory structure that stores pixel and block information enabling an analysis of input change data. One example is information indicating that progressive encoding is underway but image blocks are not in a lossless state. Another example is block change and type information. Pixels that are continuously changing and are of picture type are probably related to a video sequence and may be better suited to video encoding than progressive block encoding methods or they may be suited to variations on progressive encoding that limit bandwidth consumption at the cost of image quality. In this case table 230 may be decomposed into sub-tables supporting different image types. As another example, transform method may be important. For example, if a DCT transform algorithm is used, the progressive encoding of all pixels in a block may be necessary if any pixels change. Various embodiments of table 230 are described below and illustrated in FIG. 6.

Encoder 220 is also provided bandwidth information as signal 222 to support the computation of encoding levels. Bandwidth information may be a register value initialized to a fixed allocation for each region or it may be a variable that can be updated by sub-system 100 or external equipment such as traffic management equipment. In one embodiment, available bandwidth is dependent on the status of other regions and is updated once earlier regions have been analyzed.

Image blocks are encoded and forwarded to network interface 240 across bus 224. Network interface 240 hosts a standard networking protocol stack (e.g. TCP/IP) and provides a physical interface such as Ethernet to network 110. Network interface 240 performs network-layer encapsulation of the encoded data and transmits the data to a remote system such as that described herein and illustrated in FIG. 4.

Figure 3:
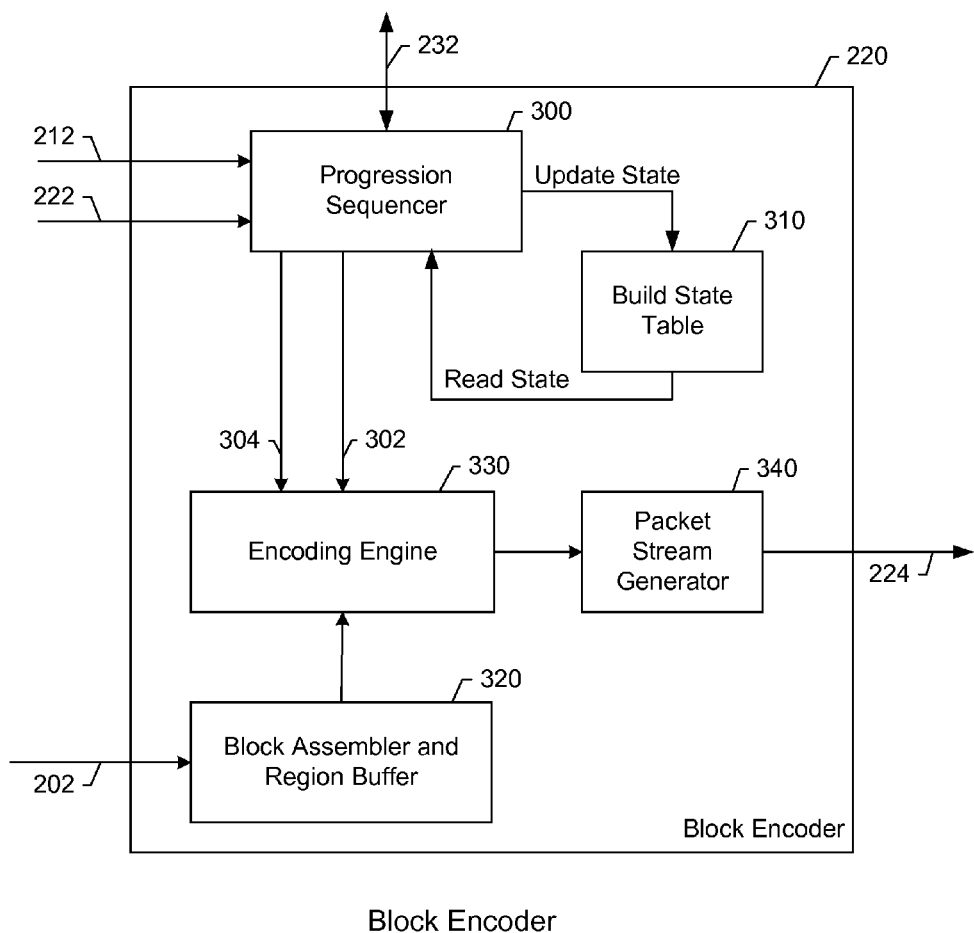
FIG. 3 shows the architecture for an embodiment of a block encoder.

FIG. 3 shows an embodiment of encoder 220 in FIG. 2. In the embodiment, progression sequencer 300 controls encoding methods and manages the build states of incoming image blocks. State sequencer 300 applies one or more of the sequencing methods described herein to determine the next build state for an image block based on signal 212, the build state for an image block as stored in build state table 310, a regional summary as stored in table 230 and bandwidth information 222. In an alternative embodiment, sequencer 300 uses additional information such as image type to determine an encoding method and sequence.

In the embodiment shown, block assembler and region buffer 320 assembles incoming pixels on bus 202 into image blocks of 8×8 pixels and stores them locally. Note that pixels on bus 202 arrive at encoder 220 in advance of change detection signal 212 for the same block hence the requirement to buffer the pixel stream. Signal 212 signals which blocks in a region have changed compared with the same blocks in the previous frame and that a new encoding sequence for those blocks should be initiated. If a block has changed, an entry for the block is flagged accordingly using a change detection mask in build state table 310 that is also used to record the current state of each image block. In an alternative embodiment, table 310 also records the number of frames that have passed since the input image has changed. Image blocks that changed in a much earlier frame but have not reached a lossless state may receive a higher priority bandwidth allocation as described herein and illustrated in FIG. 22.

Sequencer 300 retrieves stored region information from table 230 that provides a build state summary for blocks in the region and bandwidth estimates to advance blocks to higher quality levels. Sequencer 300 searches the change detection mask in table 310 for bits indicating changed blocks and updates table 230. Sequencer 300 then performs a bandwidth analysis using the methods described herein and illustrated in FIG. 9 and selects a next coding quality level for each block in the region.

Each block is then encoded by encoding engine 330 under control of sequencer 300. In the present embodiment, engine 330 is a selectable quality encoding engine that obtains a specified encoding method (ref. Encoder method signal 302) from sequencer 300 to process blocks in buffer 320. In the embodiment, image blocks are transformed into layered bit-planes using standard DCT transform methods.

Sequencer 300 specifies a desired coding quality level using desired coding quality signal 304. Signal 304 determines the number of quality levels to be encoded for each block based on the previous quality level (as recorded in table 310), available bandwidth 222, state of other blocks in the region and selected progression sequence. Sequencer 300 also specifies an encoding domain using encoder method signal 302. Once the region has been processed, the new build state for each block is updated in table 310 and table 230 (in FIG. 2) is updated to reflect a summary of the region state.

Packet stream generator 340 then builds encoded packets for transmission using the designated encoded bit planes and transmits them on bus 224. In an alternative embodiment, the remaining bit planes are temporarily stored in buffer 320 for future transmission. In another alternative, all the layers are encoded each time an incoming scan block is assembled.

In the present embodiment, encoding of non-overlapping image blocks predominantly occurs in the discrete cosine transform (DCT) domain, but overlapping image blocks or the discrete wavelet transforms (DWT) may also be used. Non-transformed encoding methods such as RGB or YCrCb encoding may also be used for part or all of the data. Alternative encoding methods such as spatial sub-sampling methods may be used too. One alternative is a residual encoding method that calculates and transmits a difference value by subtracting a saved copy of the previously decoded image block. Residual encoding is a simpler technique but it is less efficient because at least two bits per pixel must be transmitted and it also requires that encoder 220 maintains a copy of the data already transmitted.

Figure 4:
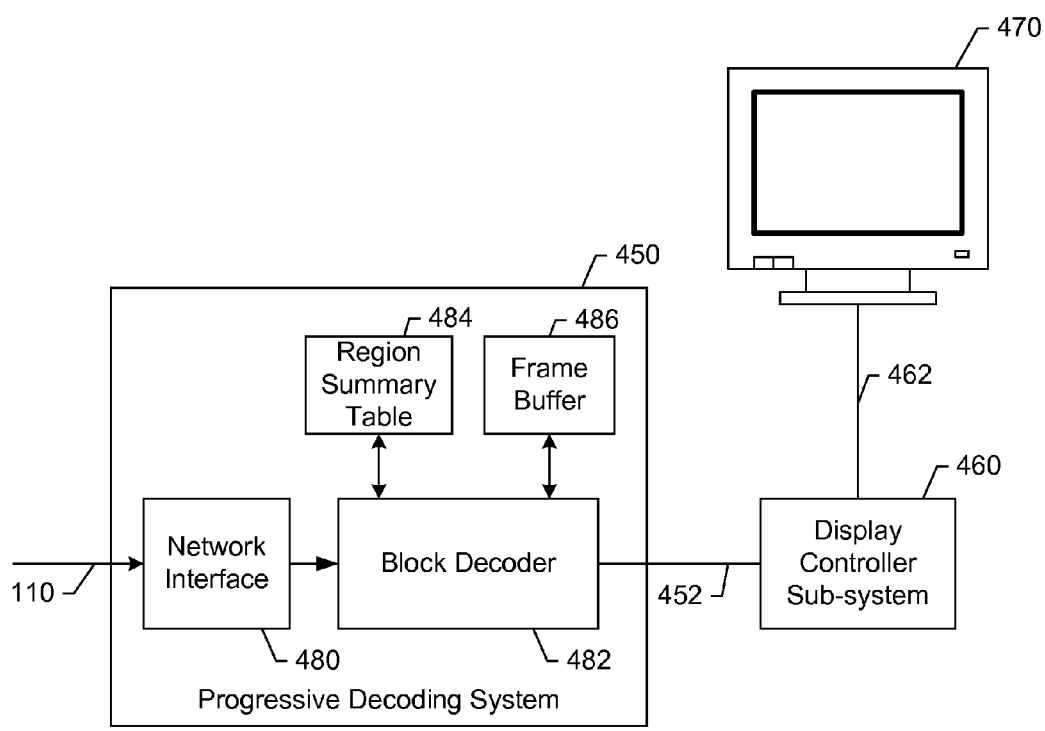
FIG. 4 shows a progressive decoding system connected to remote display via a display controller sub-system.
Figure 7:
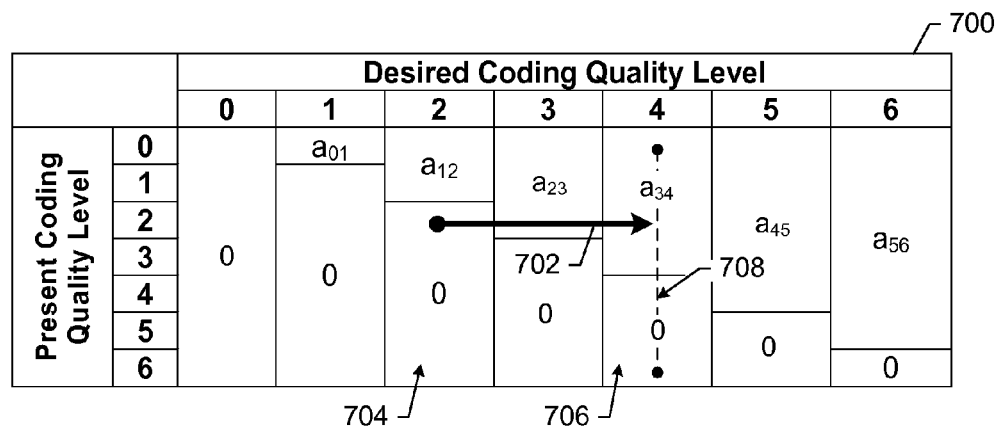
FIG. 7 presents a bandwidth analysis table with a bandwidth estimation method for the progression of a single block.

FIG. 4 shows a progressive decoding system connected to a remote display via a display controller sub-system. System 450 receives encoded progressive image data from system 108 in FIG. 1 across network 110. System 450 also receives information from system 108 including block type information, a description of which blocks are changing, target quality line information (as illustrated in FIG. 7) and encoding method in embodiments that use different encoding methods for different regions. System 450 then uses this information to decodes the encoded progressive data using similar methods used by encoder 220 in FIG. 2. System 450 maintains region summary table 484 that is synchronized with table 230 in FIG. 2.

System 450 is comprised of standard network interface 480 connected to network 110. A stream of encoded pixel blocks at different states of progressive build are forwarded from interface 480 to block decoder 482. Decoder 482 includes its own progression sequencer and build state table so it can determine the next build state for each block without a requirement for separate transmission of this information. It decodes incoming bit planes using an equivalent decoding method and engine to encoding engine 330 in FIG. 3. In one embodiment, blocks that have been encoded using an 8×8 DCT transform are decoded by decoder 482 using an inverse DCT transform on incoming encoded data. Decoded blocks are then forwarded to standard display controller sub-system 460 across bus 452. Coefficient information is then stored in frame buffer 486. When the next refinement level for a block arrives (for example, as a set of DCT coefficient refinements), the stored coefficient information is retrieved from frame buffer 486, added to the new refinement information, transformed to the image domain and forwarded to sub-system 460. In the case where an image block remains unchanged at system 108 (in FIG. 1), no pixel data is transferred across network 110 but rather decoder 482 retrieves and decodes the coefficients thereby preserving network bandwidth. In an alternative embodiment, decoder 482 also stores decoded blocks in frame buffer 486 to reduce processing in the case where a block is unchanged. Sub-system 460 generates standard display connection 462 for remote display 470. Connection 462 may be a VGA bus, a Digital Visual Interface Signal (DVI) or other standard display connection.

Figure 5:
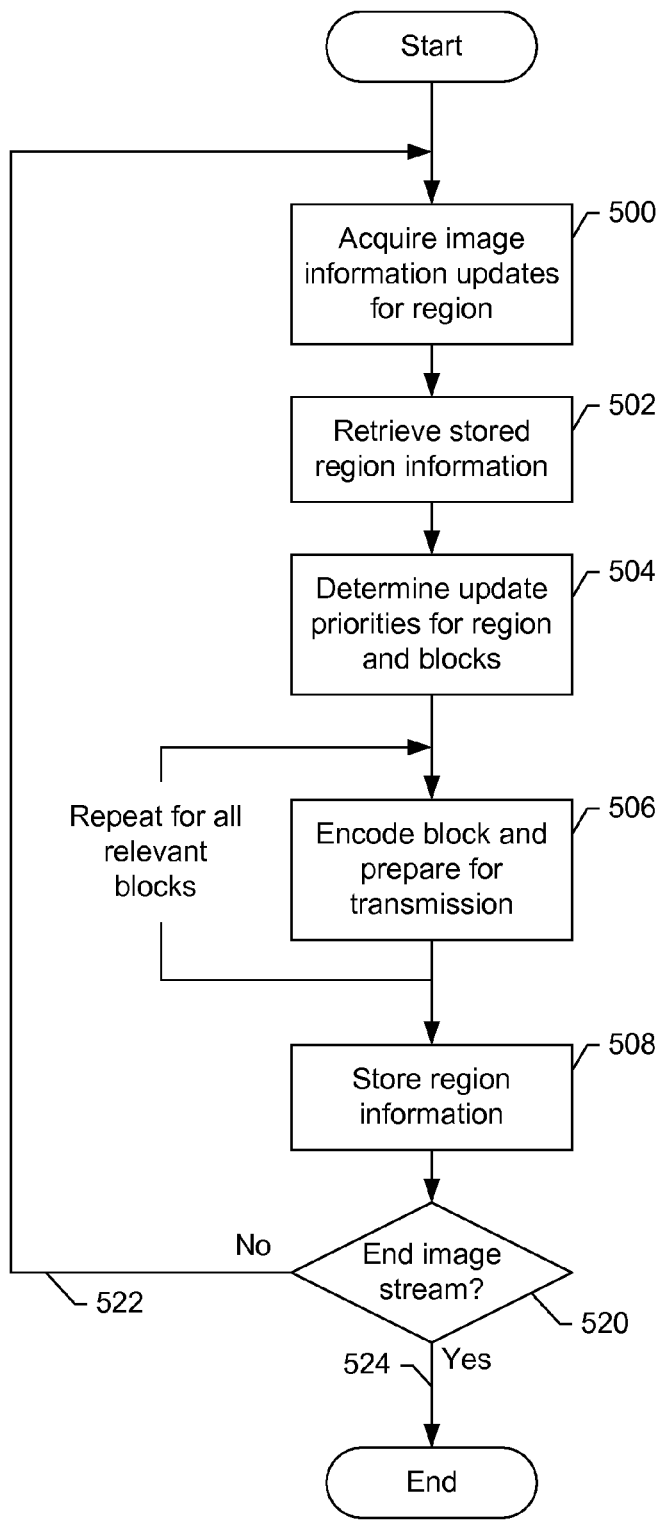
FIG. 5 shows a method that enables the progressive encoding of a computer display image stream.

FIG. 5 shows a method that enables the progressive encoding of a computer display image stream as may be executed using system 108 in FIG. 1. Changes to image content in a region are identified, analyzed and used to determine the encoding specification for the update of each block in the region. Each block identified for update is encoded to a desired coding quality level. The process is repeated for other regions of the display and for ongoing frames in the display stream.

In one embodiment, an image is encoded into a series of bit planes of increasing quality (where the increased quality could be measured using PSNR or other methods). Each encoded bit plane is directly associated with a coding quality level. The lowest quality level may include multiple bit planes necessary to provide a minimum coding quality level (identified as quality level 1 in this specification). Each additional bit plane (or set of bit planes) is associated with an increment in coding quality level. In one embodiment, the highest coding quality level is associated with all of the bit planes necessary to achieve a numerically lossless decoded image including the color space conversion. Bit planes may also be sub divided to create additional quality levels. In an embodiment where data is transformed to the frequency domain, the low frequency data may constitute one sub-plane while the high frequency data constitutes another. If the data is not transformed, groups of bit planes may be segmented along spatial boundaries to create additional quality levels. In alternative embodiments, different encoding methods may be used over different ranges of quality levels. In this case, there may not be a direct relationship between a bit plane and a coding quality level. However, a common coding quality metric can still be scaled and used to control the different encoders and identify incremental improved measurable output quality levels.

Referring to FIG. 5, image information updates for a region are acquired as a first step 500. Update information includes updated image content (referred herein as "input change") and updated image attributes including image type as described herein and illustrated in FIG. 2. Note that image information updates may be acquired in advance of a regional analysis of that region. For example, updates may be acquired for a region that is one or more regions or frames ahead of the region under analysis. This forward looking analysis allows the system to manage the bandwidth over a larger window and reserve bandwidth for large area updates that are detected ahead of the current region being processed. The forward looking analysis is a trade-off between better network bandwidth utilization and latency. The further ahead the system looks, the better the bandwidth utilization at the expense of increased image transfer latency.

As a next step 502, regional information describing the number of blocks at each coding quality level is retrieved. The present embodiment stores information using table 230 in FIG. 2. In the present embodiment, changes are managed at a block level. Any pixel change is identified as a block change and all pixels in the block are re-encoded and transmitted. The first time through the processing loop the stored region information is at an initial state. Which results in all blocks being recognized as changed during the next operation.

As a next step 504, update priorities for the region are determined based on available bandwidth and information from table 230 (in FIG. 2). An embodiment of a table 230 is presented in FIG. 6. Specific methods for determining update priorities are a major aspect of this specification and are described herein and illustrated in FIG. 9.

As a next series of steps 506, blocks that have been identified for update are encoded and prepared for transmission. In one embodiment, a changed block is first fully encoded into a set of independent bit planes containing increasing quality information. In this case, one or more additional encoded bit planes are selected for transmission. In an alternative embodiment, a block is partially encoded to a defined coding quality level and all the encoded information selected for transmission. In yet another embodiment, partial bit planes are transmitted. For example, if a discrete wavelet transform method is used, frequency sub-band information, such as HH, HL, LH or LL sub-band information may be transmitted. Preparation for transmission may include additional standard entropy, arithmetic or other encoding and packetization e.g. IP packetization for transfer across a computer network. This may be done a block or a region at a time.

As a next step 508, updated build states following the encoding process are stored for the next analysis of the same region. The present embodiment uses table 230 in FIG. 2.

As a next step 520, a process termination test is conducted. In case 522, processing is repeated for the next region of the frame. At the end of a frame the method continues by processing the top region of the next frame and updating the frame count accordingly. In case, 524, the method terminates when there is no longer a desire to transfer the image, for example in preparation for a system shutdown.

An alternative embodiment of the method is useful in situations where not all of the allocated bandwidth has been used and there is additional processing bandwidth available. The alternative method reprocesses a region where there has been no change to the input image. This enables the additional bandwidth to be used to improve the coding quality level of the image.

FIG. 6 shows an embodiment of region summary and analysis table 230 in FIG. 2. In FIG. 6, region summary and analysis table 600 includes summary section 602 which maintains a record of the number of blocks at each coding quality level and analysis section 604 which maintains bandwidth estimates on the bandwidth required to move a block from one coding quality level to another.

In the present embodiment, k0-k6 are variables that track the number of blocks for each indicated present coding quality level (as previously defined) for a total of K blocks (reference 610) in the region. Table 600 tracks 6 present quality levels and a "0" quality level on separate rows. The 0 level is used to track blocks that have undergone an input change (e.g. frame buffer update or changed input raster information for block), but no content update information has been encoded or transmitted. Alternative embodiments may use fewer or more coding quality levels to enable increased scalability in the encoded stream. In one alternative illustrated by FIG. 16, sixteen levels are used. The greater the number of levels the finer the bandwidth control. Additional bandwidth resolution may be achieved by limiting the number of blocks that transition between two levels during one update cycle.

Columns of section 604 provides estimates a00-a56 in terms of number of encoded bits for the amount of data required to move a block from any present coding quality level to a next desired quality level. A bandwidth estimate in terms of a bits/second or similar metric is easily derived by dividing the total number of encoded bits for a region by the time window allocated to transmit all the encoded bits in the region. Alternatively the desired bandwidth can be defined as the number of bits per region and the values a00-a56 can be defined as bits per block. Bandwidth analysis estimates B1-B6 (reference 612 and others shown) provide total estimates of bandwidth requirements to progress all blocks to the indicated desired coding quality level. In one embodiment illustrated in FIG. 10, all blocks are incremented to the same desired coding quality level. Other embodiments are also described herein.

Note that table 600 is a simplified table that assigns the same estimates (a00-a56) for all image types (picture, text, background video etc) and is based on an entire block change. A more complex table may include different bandwidth values for different image types and scaling factors that account for the number of pixels being encoded. One method of enabling different progressive sequences for image blocks of different types is to decompose table 600 into a series of sub-tables, each sub-table then maintains a record of the number of blocks of a defined image type (or sub-region) at each present coding quality level (kn) and bandwidth estimates for each image type (or sub-region). An embodiment with a region comprising text, pictures and background may define three sub-tables.

A second simplification applied to table 600 makes an assumption that the data required to move a block by multiple levels in a single step is the sum of data required to move the block incrementally from the lower to the higher value using multiple steps. For example, it is assumed that a total of a23+a34 bits is required to move a block from a present coding quality level of 2 to a desired coding quality level of 4. However, an alternative embodiment is possible where encoding efficiencies may reduce the data in cases of multi-level increments. In this case, table 600 may be modified to store additional estimates showing transitions between any level and any other prospective level.

In an embodiment where different encoding methods are used for different stages of an encoding progression, the estimates are adjusted to reflect the encoding efficiencies for each encoding method used. One example uses two encoding methods. A set of N−1 coding quality levels is achieved using a first transform-domain encoder. As a final step, a residual encoder is used to transform blocks from a lossy level N−1 to a lossless level N.

Figure 8:
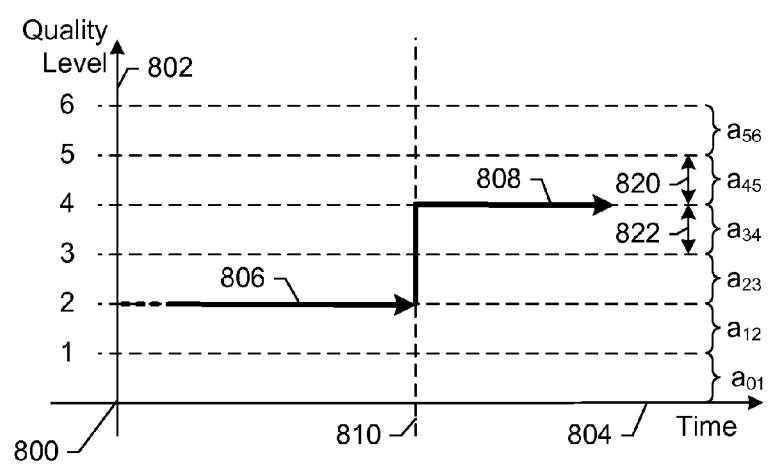
FIG. 8 shows a graph of a progression in coding quality level for a single block.

FIG. 7 and FIG. 8 provide an example that illustrates how table 600 is used to estimate bandwidth required to move a block from one level to the next.

FIG. 7 presents a bandwidth analysis table and a bandwidth estimation method for the progression of a single block. Bandwidth analysis table 700 is an abbreviated form of region summary and analysis table 600 in FIG. 6. Data such as k0-k6 in section 602 of table 600 in FIG. 6 is assumed to be available. The progression of a single block is shown to illustrate an estimation of bandwidth in a simplified progression. Arrow 702 shows the progression of a block from a present coding quality level of 2 (reference column 704) to a desired coding quality of 4 (reference column 706) where a vertical line 708 through column 706 represents a simple embodiment of a target quality line. A bandwidth estimate for the described block is a23+a34. In the case of a total of k2 blocks (reference FIG. 6) starting at coding quality level 2 and ending at a coding quality level of 4, the total bandwidth estimate bwtotal is calculated as $$bw\text{total} = k2 \times (a23 + a34) \quad (1)$$

In an alternative embodiment where a region has different image types and table 700 is comprised of a sub-table supporting each image type, each sub-table may have an independent target quality line.

FIG. 8 presents graph 800 that plots coding quality level on vertical axis 802 against time on horizontal axis 804. Graph 800 shows the increase in coding quality level for a block subjected to the progression described herein and illustrated in FIG. 7.

At time 810, the described block progresses from a present coding quality level 2 (reference 806) to desired coding quality level 4 (reference 808). It is worth noting that vertical quality level axis 802 shows equal measured quality level increments for each of the defined coding values shown. However, the bandwidth required to move a block from one level to the next increases as the measured quality level increases. For example a45 (reference 820)>a34 (reference 822) in FIG. 8. In fact, an increase of 2× per bit plane may be found in a representative embodiment. It is this non-linear increase in bandwidth requirement that prevents the use of a simple formula for incrementing all blocks towards a lossless state at the same rate and forms the basis for the more sophisticated progression priority schemes introduced in FIG. 9.

Figure 9:
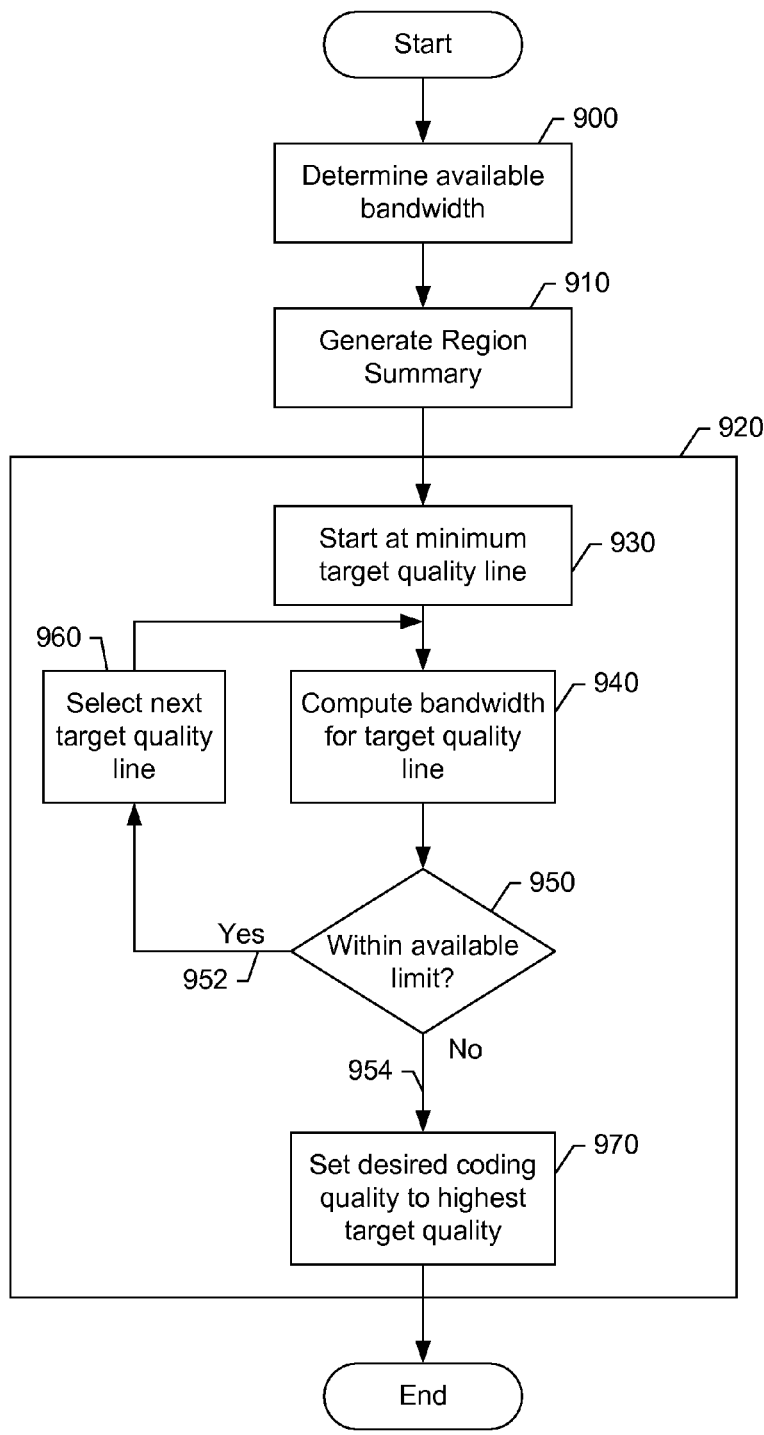
FIG. 9 shows a method for determining update priorities for a region.

FIG. 9 shows an embodiment of step 504 in FIG. 5 for determining update priorities for a region. In a simple embodiment, update priorities for a region are determined by the state of the current region as described by a region summary and analysis table such as table 600 in FIG. 6 using fixed available bandwidth constraints. In more sophisticated embodiments, update priorities are also influenced by bandwidth forecasts, the state of other regions, and decoder or network error conditions which override the progressive encoding sequence by forcing retransmission or transmission of initial update information.

Referring to FIG. 9, the available bandwidth for a region is determined as a first step 900. In one embodiment, a fixed available bandwidth for a frame is evenly distributed across the regions comprising the frame. In an alternative embodiment, one or more regions demanding a high bandwidth (e.g. a video sequence as determined by hints from the application software or change patterns at a block level) are allocated additional bandwidth at the expense of less dynamic regions. In another embodiment, traffic shaping methods are used to spread the bandwidth fairly over different regions.

As a next step 910, a regional summary is generated so that progressive build requirements may be determined based on the regions most recent change information. In the present embodiment, table 600 is updated such that blocks that have changed are reset to a present coding quality level of 0 (entry "k0" in column 602 of table 600 in FIG. 6). In an embodiment that enables a dynamic selection between different target quality line styles as described by the different target quality line embodiments below, step 910 may include the selection of a style of target quality line based on available bandwidth or region summary. In an alternative embodiment, an initial style is selected for each identified image type but is subject to change based on a bandwidth analysis (step 940 below). In an embodiment where step 500 identifies blocks as being of video type, one or more target quality lines may be selected during that step.

As a next series of steps 920, the desired coding quality level for the blocks in the region is determined. Several embodiments using different target quality lines are illustrated by later figures below. In an embodiment supporting multiple target quality lines associated with different image types or independent sub-regions of the same type but with different target quality lines, steps 920 are repeated for each areas target quality line represented.

A minimum target quality line is selected as step 930. There are many possible methods for selecting a minimum target quality line. In one embodiment, historic estimates are used to determine the starting point for a new estimation. In another embodiment, a current block distribution is used as a starting point for a first estimate. The bandwidth required to meet the target quality is calculated as next step 940. Different embodiments use different formulae as described below.

As next step 950, a check is performed to test if the required bandwidth is within the available bandwidth. In case 952, bandwidth is available so a higher target quality line is selected as step 960 and step 940 is repeated using the higher target. In case 954, the required bandwidth exceeds the available bandwidth so the desired coding quality is set to the previous (lower) target quality line as final step 970.

Figure 10:
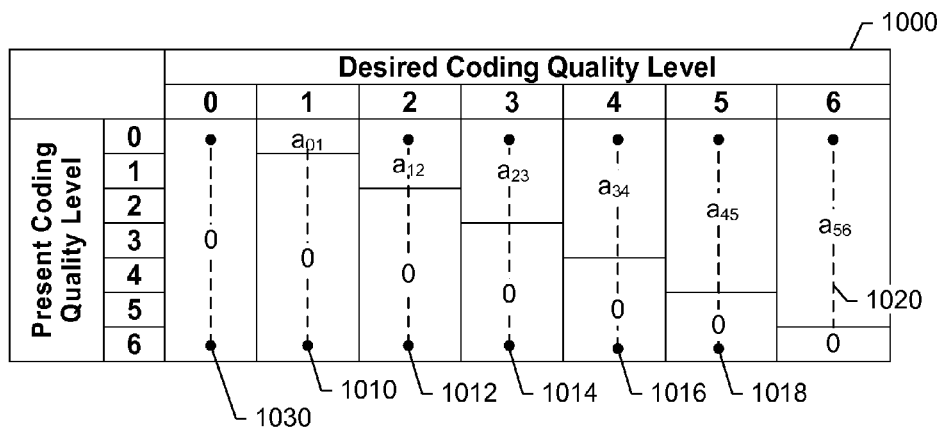
FIG. 10 presents a bandwidth analysis table and method for progressing the coding quality of a region by moving all changed blocks to a same desired coding quality level.
Figure 11:
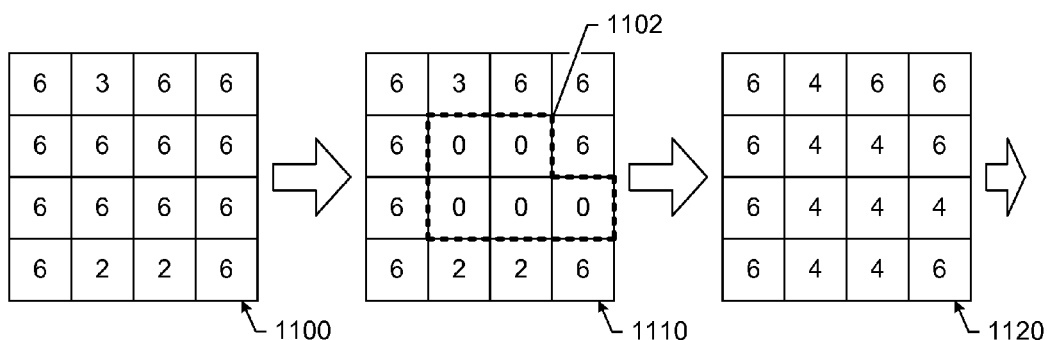
FIG. 11 illustrates a progression for a region of 4×4 blocks to a same quality level.
Figure 12:
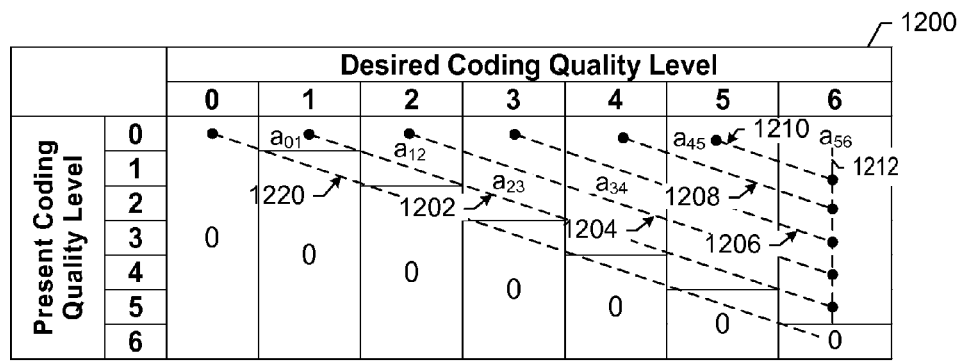
FIG. 12 presents a bandwidth analysis table and method for progressing the coding quality of a region by updating all changed blocks by a same increment.
Figure 13:
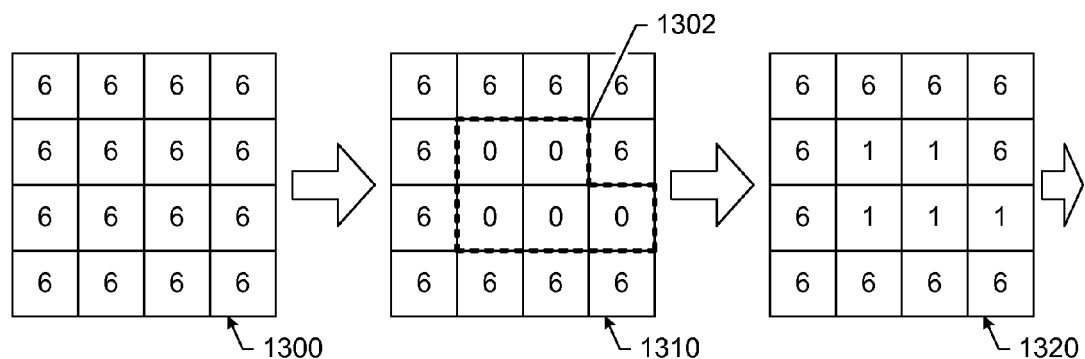
FIG. 13 illustrates a progression for a region of 4×4 blocks using a same coding quality increment for all changed blocks.
Figure 13:
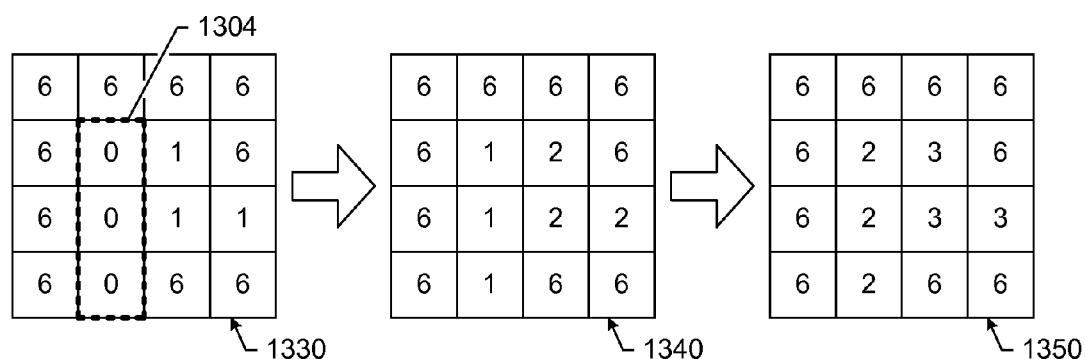
Figures 14, 15:
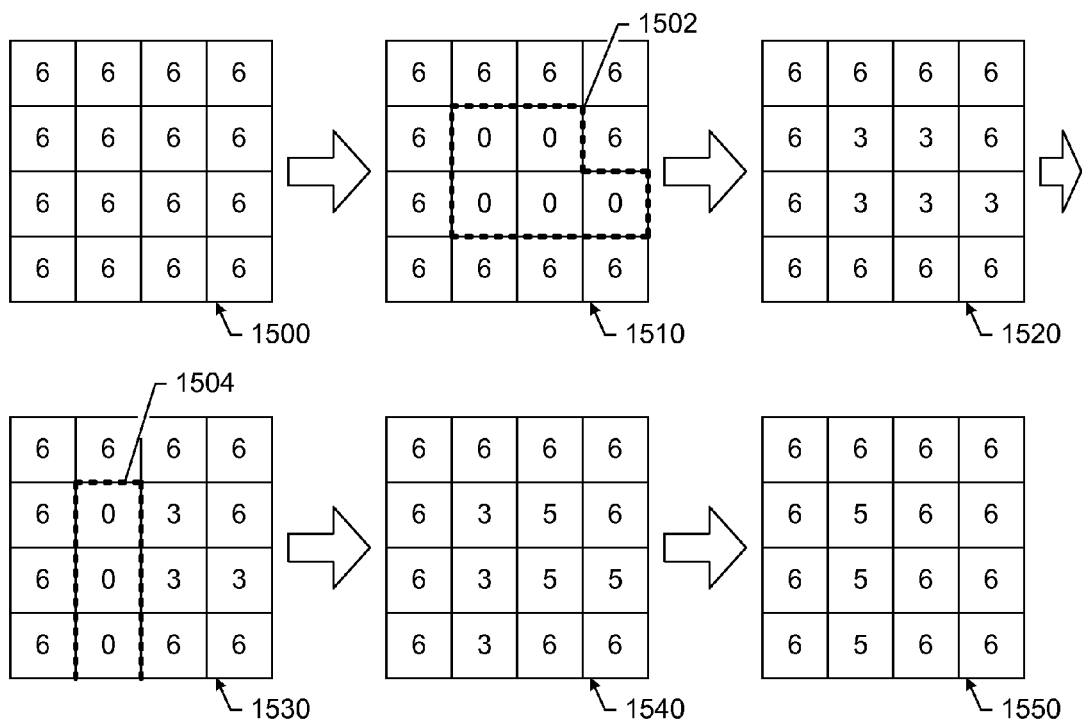
FIG. 14 presents a bandwidth analysis table and method for progressing the coding quality of blocks using a proportional coding quality increment.
FIG. 15 illustrates a progression for a region of 4×4 blocks using a proportional coding quality increment.
Figure 16:
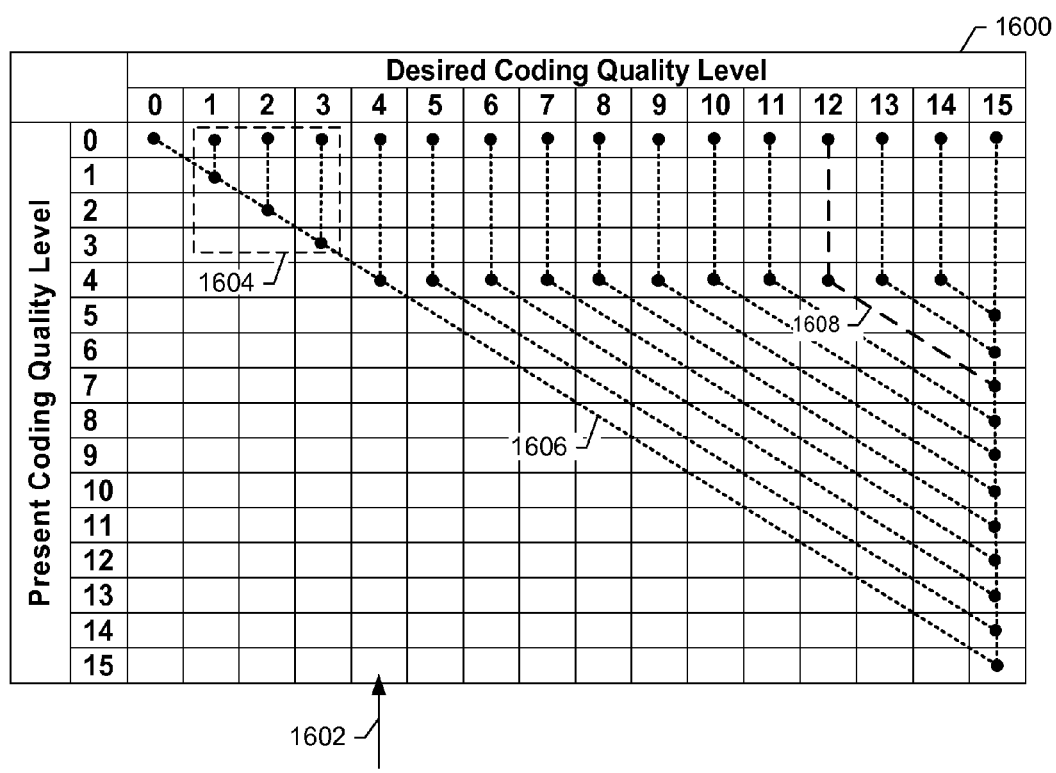
FIG. 16 presents a bandwidth analysis table and method for progressing the coding quality of blocks such that the progression of low quality blocks to a baseline threshold quality level is prioritized.
Figure 17:
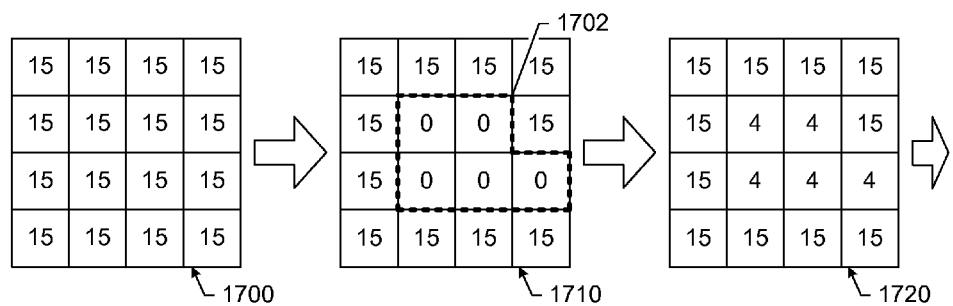
FIG. 17 illustrates a progression for a region of 4×4 blocks using a proportional coding quality increment.
Figure 17:
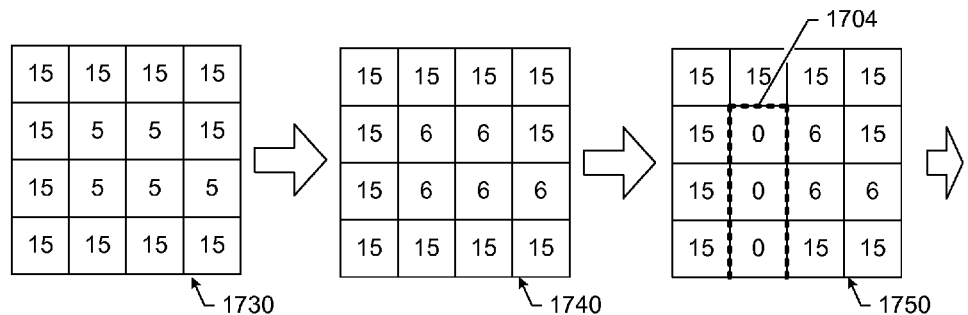
Figure 17:
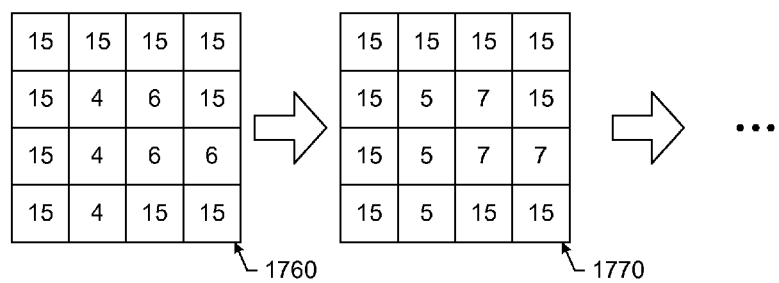
Figure 19:
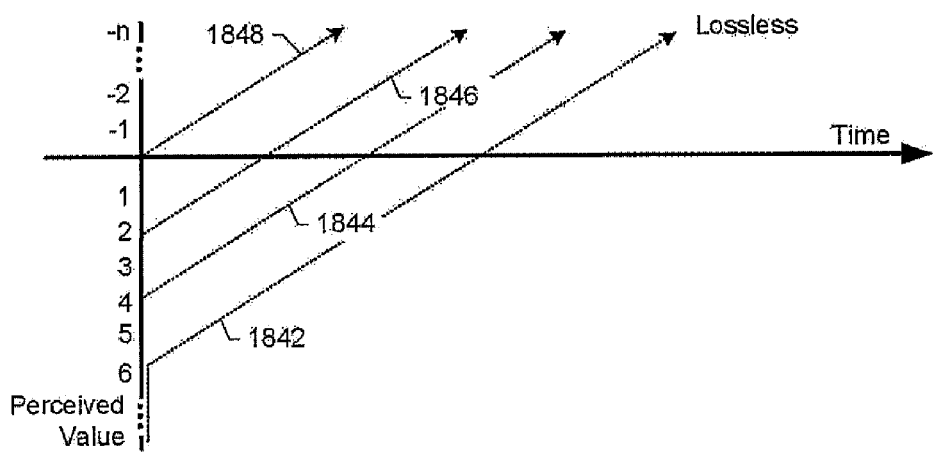
FIG. 19 shows a plot of perceived quality over time for an embodiment where it is acceptable to experience a high quality image that is obsolete even when the input has changed.

FIG. 10 and FIG. 11 describe an embodiment that loops through step 920 using target quality lines that bring changed blocks to the same desired coding quality level. FIG. 12 and FIG. 13 describe an embodiment that loops through step 920 using target quality lines that increments changed blocks by the same coding quality increment. FIG. 14 and FIG. 15 describe an embodiment that loops through step 920 and more recent updates are prioritized by assigning them proportionally larger increments. FIG. 16 and FIG. 17 describe an embodiment that loops through step 920 and recent updates are prioritized by establishing a baseline quality threshold used for all blocks ahead of improving the quality level of blocks over the threshold. In FIG. 19, blocks are incremented at different rates, dependent on current perceived quality levels. Other embodiments are also possible.

FIG. 10 presents a bandwidth analysis table and method for progressing the coding quality of a region by moving all changed blocks to a same desired coding quality level. Bandwidth analysis table 1000 is an abbreviated form of table 600 in FIG. 6. Data such as k0-k6 in section 602 of table 600 in FIG. 6 is assumed to be available. In the present embodiment, a pre-determined available bandwidth value is assumed. This may be a constant value or a variable value provided in advance by an independent processing method.

Total data and associated bandwidth requirements are determined for each desired coding quality level, indicated by target quality lines 1010, 1012, 1014, 1016, 1018 and 1020 shown. Zero bandwidth line 1030 represents a baseline target where no blocks are updated and consequently no bandwidth is consumed. A highest target quality line within the available bandwidth is then selected using the method described by step 920 in FIG. 9 and all blocks in the region below the target are encoded to the selected target quality line. All blocks at the target or above the target remain unchanged. Table 1 presents a set of equations used by this embodiment in step 940 (ref. FIG. 9) for calculating bandwidth requirements for target quality lines at different desired coding quality levels.

TABLE 1

Bandwidth Estimation for Blocks Increased to Same Coding Quality

| Desired Coding Quality Level | FIG. 10 Target Quality Line Reference | Estimated Bandwidth Requirement |
| --- | --- | --- |
| 0 | 1030 | 0 |
| 1 | 1010 | $bw_{01} = k_0 \times a_{01}$ |
| 2 | 1012 | $bw_{02} = bw_{01} + (k_0 + k_1) \times a_{12}$ |
| 3 | 1014 | $bw_{03} = bw_{02} + (k_0 + k_1 + k_2) \times a_{23}$ |
| 4 | 1016 | $bw_{04} = bw_{03} + (k_0 + k_1 + k_2 + k_3) \times a_{34}$ |
| 5 | 1018 | $bw_{05} = bw_{04} + (k_0 + k_1 + k_2 + k_3 + k_4) \times a_{45}$ |
| 6 | 1020 | $bw_{05} = bw_{05} + (k_0 + k_1 + k_2 + k_3 + k_4 + k_5) \times a_{56}$ |

FIG. 11 shows three consecutive progression states in a region where all blocks are increased to a same coding quality level. The example uses initial assumptions that blocks in the region are at initial progression state 1100 with initial present coding quality levels as indicated by the values associated with each block. Under the illustrative constrains of the example, the available bandwidth (bwregion) for the region is $$bw04 <= bwregion < bw05 \quad (2)$$

where bw04 and bw05 are previously defined in Table 1.

In the example, area 1102 is subjected to an input change. The changed blocks are therefore assigned a present coding quality level of 0 as shown in progression state 1110. Note that no updates have been encoded or transmitted at this time. In the example, the other blocks in the region remain unchanged. Ideally, changed area 1102 is immediately updated to a coding quality level of 6 in a single step corresponding with an ideal desired coding quality for area 1102.

However, due to the available bandwidth limitations imposed by equation (2), the highest target quality line within the limit is bw04 (reference target quality line 1018 in FIG. 10). Therefore a first update using a desired coding quality value of 4 for changed area 1102 and other partially progressed blocks is chosen as shown in progression state 1120.

The described example illustrates a simple method whereby all blocks are updated to a same desired coding quality level. In a practical application, each region is subjected to multiple changes at different times and alternative prioritization methods, such as those introduced below, are useful in ensuring that blocks at a low coding quality are updated while blocks at higher coding quality levels do not stagnate in a partially encoded state due to insufficient bandwidth.

FIG. 12 presents a bandwidth analysis table and method for progressing the coding quality of a region by updating all changed blocks by the same increment. One method of ensuring that blocks at higher coding quality levels do not stagnate in a lossy progression state is to increment all changed blocks by the same increment, independent of their present coding quality levels.

Bandwidth analysis table 1200 is an abbreviated form of table 600 in FIG. 6. Data such as k0-k6 in section 602 of table 600 in FIG. 6 is assumed to be available as before. Total data requirements are determined for each desired coding quality level, indicated by target quality lines 1202, 1204, 1206, 1208, 1210 and 1212 shown in bandwidth analysis table 1200 of FIG. 12. As before, zero bandwidth line 1220 represents a baseline target where no blocks are updated and consequently no bandwidth is consumed. The highest target quality line within the available bandwidth is then selected and all blocks in the region below the target quality line are encoded to the selected target quality line. All blocks at the target or above the target remain unchanged. Note that the target lines turn and run vertically downwards at the maximum quality column to prevent the constant increment from setting any quality levels above maximum coding quality level 6. (e.g. For target quality line 1204, blocks at present coding quality level 5 (reference k5 in FIG. 6) increase to desired coding quality level 6).

Table 2 presents a set of equations used by this embodiment in step 940 (ref. FIG. 9) for the calculation of estimate values for a set of target quality lines, a selection of which are shown in FIG. 12

TABLE 2

Bandwidth Estimation for Blocks Increased by Same Increment

| Quality Increment | FIG. 12 Reference | Estimated Bandwidth Requirement |
|---|---|---|
| 0 | 1220 | 0 |
| 1 | 1202 | $ibw_1 = (k_0 \times a_{01}) + (k_1 \times a_{12}) + (k_2 \times a_{23}) + (k_3 \times a_{34}) + (k_4 \times a_{45}) + (k_5 \times a_{56})$ |
| 2 | 1204 | $ibw_2 = ibw_1 + (k_0 \times a_{12}) + (k_1 \times a_{23}) + (k_2 \times a_{34}) + (k_3 \times a_{45}) + (k_4 \times a_{56})$ |
| 3 | 1206 | $ibw_3 = ibw_2 + (k_0 \times a_{23}) + (k_1 \times a_{34}) + (k_2 \times a_{45}) + (k_3 \times a_{56})$ |
| 4 | 1208 | $ibw_4 = ibw_3 + (k_0 \times a_{34}) + (k_1 \times a_{45}) + (k_2 \times a_{56})$ |
| 5 | 1210 | $ibw_5 = ibw_4 + (k_0 \times a_{45}) + (k_1 \times a_{56})$ |
| 6 | 1212 | $ibw_6 = ibw_5 + (k_0 \times a_{56})$ |

A progression example for a region using the target quality lines of FIG. 12 is shown in FIG. 13. FIG. 13 illustrates a progression for a region of 4×4 blocks using a same coding quality increment for all changed blocks. FIG. 13 shows six consecutive states of progression in a region where all blocks are increased using the same coding quality increment. A simplified example case using an increment of 1 coding quality level for all updates has been chosen. In a practical application, the highest possible increment within the available bandwidth is selected for each update (using bandwidth estimation formulae in Table 2), taking the number of blocks at each coding quality level into consideration.

The example assumes initial progression state 1300 with all blocks in the region at maximum present coding quality level 6. In the example, area 1302 shown is subjected to an input change. The changed blocks are therefore assigned a present coding quality level of 0 as shown in progression state 1310. In the example, the other blocks in the region remain unchanged.

The constraints imposed by the example dictate a desired coding quality increment of 1 for change area 1302 for a first update. Therefore changed blocks progress to a coding quality level of 1 in a first update step as shown in progression state 1320. Progression state 1330 shows different area 1304 subjected to a second input change and set to a present coding quality level of 0. A desired coding quality increment of 1 for the change areas 1302 and 1304 is once again chosen per constraints of the example. All changed blocks progress by a single coding quality increment in a second update step as shown in progression state 1340. Progression state 1350 shows a third time the region is updated but where no input changes are present. In the third update step all the changed blocks that have not reached final coding quality level 6 are incremented again. The sequence is assumed to continue until all blocks once again reach a present coding quality level of 6 or additional input changes trigger additional progressions.

The described example illustrates a simple method whereby all blocks are incremented at the same rate. Given sufficient bandwidth availability, this results in a perceptually constant update rate for all changed regions of an image. However, in many applications, perceptual quality of a display is improved by providing a higher coding priority to blocks at a lower present coding quality levels. This may be accomplished using various strategies, two of which are detailed below.

FIG. 14 presents a bandwidth analysis table and method for progressing the coding quality of blocks using a proportional coding quality increment. One problem with incrementing all blocks by the same rate is that blocks at higher coding quality levels require a significant proportion of the available bandwidth for a low additional improvement in perceptual quality. At the same time, this prevents the rapid progression of blocks at a low perceptual quality. Some of this bandwidth may be more effectively utilized by allocating it to blocks at a low coding quality. In most instances, a progression from a low quality level to a medium coding quality level has higher perceptual value than an incremental improvement between two higher coding quality levels.

Bandwidth analysis table 1400 is an abbreviated form of table 600 in FIG. 6. Data such as k0-k6 in section 602 of table 600 in FIG. 6 is assumed to be available as before. The bandwidth is estimated for target quality lines 1402, 1404, 1406, 1408 and others implied. Target quality lines converge at point 1404 as shown. As before, zero bandwidth line 1420 represents a baseline target where no blocks are updated. The highest target quality line within the available bandwidth is then selected as before. All blocks in the region below the target are encoded to the selected target quality line. All blocks at the target or above the target remain unchanged. Note that in the present embodiment, the encoder operates to integer quality levels and therefore the lines are rounded to the closest desired integer quality level for each present coding quality level. A progression example for a region using the target quality lines of FIG. 14 is shown in FIG. 15.

FIG. 15 illustrates a progression for a region of 4×4 blocks using a proportional coding quality increment. FIG. 15 shows six consecutive states of a progression in a region where all blocks are increased using a proportional coding quality increment. For illustration purposes, a simple 3>2>1 increment sequence for all updates is used in this example to move blocks from an initial coding quality level of 0 to a final coding quality level of 6 (i.e. Changed blocks are first move to quality 3 on a first update, then to quality 5 on a second update and finally to quality 6 on a third update (3>2>1)). In a practical application, the fastest possible increment sequence within the available bandwidth is selected for each update, taking the number of blocks at each coding quality level into consideration as before.

The present embodiment uses an initial assumption that all blocks in the region are at an initial maximum present coding quality level of 6 as shown in progression state 1500. In the example, area 1502 shown is subjected to an input change. The changed blocks are therefore assigned a present coding quality level of 0 as shown for next progression state 1510. In the example, the other blocks in the region remain unchanged.

The target quality line for a first update (approximated by line 1402 in FIG. 14) translates to a desired coding quality increment of 3 for change area 1502 per constraints of the example. The changed blocks progress to a coding quality level of 3 in a first update step as shown in progression state 1520. In the example, a different area 1504 of the region is subjected to an input change and set to a present coding quality level of 0 shown in next progression state 1530.

In a second update step shown (the target line is still approximated by line 1402 in FIG. 14) as progression state 1540, change area 1504 is incremented by 3 levels while change area 1502 is only incremented by 2 levels. Final progression state 1550 shows a third update step where the changed blocks are incremented again. Change area 1504 is incremented by 2 levels while change area 1502 is incremented by a single level. The sequence is assumed to continue until all blocks once again reach a present coding quality level of 6 or additional input changes trigger additional progressions.

FIG. 16 presents a bandwidth analysis table and method for progressing the coding quality of blocks such that the progression of low quality blocks to a baseline threshold quality level is prioritized. While incremental increases in coding quality levels at the lower end of the perceptual quality spectrum offer measurable quality improvements, image content may remain perceptually unintelligible or unacceptable below a baseline coding quality threshold. This limitation is particularly pertinent to applications such as computer display images where text and icons may have very fine resolutions. In such applications, it becomes important to prioritize the progression of changed input blocks to a baseline coding quality level that is perceptually significant over the improvement of blocks that have already reached the threshold. FIG. 16 describes a method of prioritizing the progression of blocks below a baseline coding quality threshold. Bandwidth analysis table 1600 in FIG. 16 is similar to previously shown bandwidth analysis tables with the exception that the number of significant coding quality levels is increased to 15. The introduction of a higher resolution system offers finer scalability over coding quality and more efficient use of available bandwidth.

Rather than constructing linear target quality lines as previously described, the lines shown in the present embodiment are segmented such that baseline coding quality threshold 1602 is established at a desired coding quality level of 4. In alternative embodiments, other baseline threshold values may be used to meet the perceptual quality requirements of the system. In other alternative embodiments the baseline may be variable, allowing a trade-off between latency and quality such that over a low bandwidth connection, the low quality baseline may be more acceptable then the additional latency required to get to a higher quality.

The present embodiment shows up to three segments for each target quality line. For example, identified target quality line 1608 is comprised of a first vertical segment that move blocks of present coding quality 0-4 to a desired coding quality of 12, followed by a second segment that increments blocks with a present coding of 5-7 in a proportional manner similar to that described by FIG. 14. Lastly, a third vertical segment moves all blocks with a present coding quality of 8-14 to a final coding quality level 15. In alternative embodiments, each target quality line may be constructed of multiple segments. Other alternative embodiments may combine lossy and lossless coding methods such that a series of constructed target quality lines is used to enable the progression of a block to a maximum lossy coding quality level. Thereafter, a state machine or other appropriate method is used to enable the progression of the block to a lossless coded quality level.

FIG. 16 shows insufficient bandwidth quality lines in area 1604 where there is not sufficient bandwidth to encode changed blocks to a minimum desired coding quality threshold 1602. In this case, changed blocks may only be progressed to desired coding quality levels 1, 2 or 3. Furthermore, unchanged blocks would not be improved in this scenario. On the next frame these blocks receive equal priority to newly changed blocks in the progression to coding quality threshold 1602.

Bandwidth requirements for the target quality lines shown is estimated using the described methods. As before, zero bandwidth line 1606 represents a baseline target where no blocks are updated. The highest target quality line within the available bandwidth is then selected as before. All blocks in the region below the target are encoded to the selected target quality line. All blocks at (or above) the target remain unchanged. The consequence of the segmented target quality lines is that blocks in the region with a coding quality level below the baseline quality threshold are moved to the threshold before any blocks are advanced beyond the threshold.

A progression example for a region using the target quality lines of FIG. 16 is shown in FIG. 17. FIG. 17 illustrates a progression for a region of 4×4 blocks using a proportional coding quality increment. FIG. 17 shows eight consecutive states of a progression in a region where all blocks below baseline coding quality threshold 1602 (reference FIG. 16) are prioritized over blocks that have reached threshold 1602.

For illustration purposes, a simple 4>1>1>1 increment sequence for all updates is used in this example to move blocks from an initial coding quality level of 0 to a final coding quality level of 15. In a practical application, the highest possible increment within the available bandwidth is selected for each update, taking the number of blocks at each coding quality level into consideration as before.

All blocks in the region are assumed to be at an initial maximum present coding quality level of 15 as shown in progression state 1700. Area 1702 is subjected to an input change and the changed blocks are assigned a present coding quality level of 0 shown in progression state 1710. In the example, the other blocks in the region remain unchanged.

The target quality line for the first update translates to a desired coding quality increment of 4 for the change area 1702 (once again per sequence constraints of the example)

and the changed blocks progress to a coding quality level of 4 in a first update step shown as progression state 1720.

This is followed by progression states 1730 and 1740 corresponding to second and third update steps in which the changed blocks incrementally progress to a coding quality level of 5 an then level 6. Progression state 1750 shows a different area 1704 of the region subjected to an input change and set to a present coding quality level of 0 followed by progression state 1760 after a forth update step where change area 1704 is incremented by 4 levels. However, unlike previous examples, change area 1702 is not incremented but remains at a present coding quality level of 6. This step illustrates the prioritization of the progression of area 1704 to a baseline threshold over the additional progression of area 1702. Finally, progression state 1770 shows the results of a fifth update step where all the changed blocks are incremented by a single level again. Change area 1704 is incremented by 1 to level 5 while blocks exclusive to change area 1702 are incremented to level 7. The sequence is assumed to continue until all blocks once again reach a present coding quality level of 15 or additional input changes trigger additional progressions.

Figure 18:
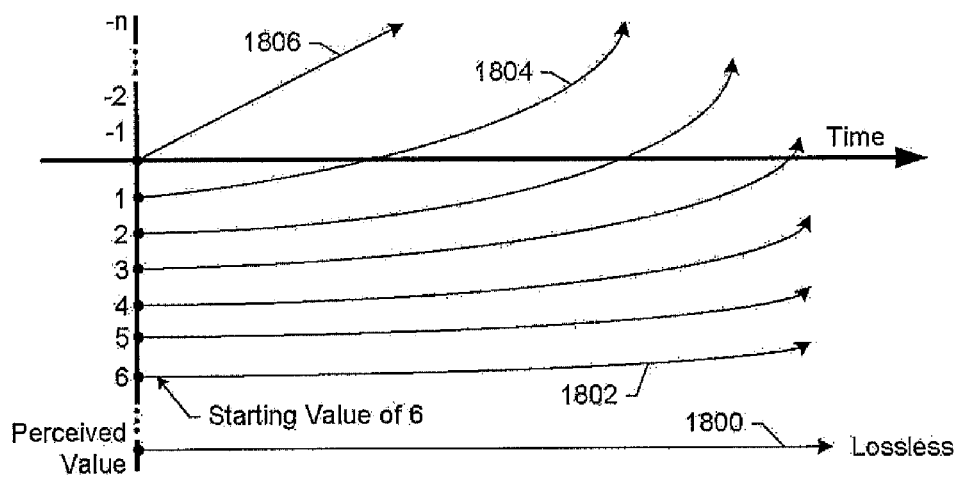
FIG. 18 shows a plot of perceived value of an obsolete image over time.

FIG. 18 is a graph illustrating the decline in perceived image quality over time for blocks that have not reached a lossless state. The bandwidth analysis tables and related block progression sequences described above operate according to measurable present and desired coding quality levels. In practice, image quality levels as perceived by the human brain have a temporal dependency. This aspect of the present invention modifies the bandwidth analysis table to compensate for the temporal dependency of perceived quality levels. Note that the present invention uses the term "perceived value" to refer to a human perceived quality level compared with "coding quality level" used to refer to a quality level that is measurable using PSNR or other means.

FIG. 18 shows a plot of perceived value over time. Lossless perceived value 1800 remains constant over time as shown while lower perceived values typically decline at increasing rates. This may be seen in FIG. 19 by comparing plot 1802 with a starting perceived value of 6 and slowly declining compared to plot 1804 with a starting perceived value of 1 and rapidly declining. Values starting at 0 and declining in the negative domain (reference perceived quality line 1806) represent the perceived quality of image content that has not been updated at all and therefore the displayed content is obsolete and inaccurate.

Note that the slope of the curves on the graph, especially in the negative perceptual value domain are dependent on the perceptual nature of the application. In one case, it may be both pleasing to the human brain and functionally acceptable to experience a high quality image that is obsolete because the input has changed. A sequence of photographs is one specific example where this may be true. In this case, the perceptual value of obsolete image content remains relatively high over time. Note that the actual period of time that content is "obsolete" using the present invention is usually less than 1 second and more typically less than 100 ms. In another case more typical of a computer display environment, while visually less appealing, it is more important to replace obsolete content with updated content, even if the updated content is presented at a lower quality level. A simple example is a stock trader monitoring real-time trading data. In this case, the perceptual value of obsolete declines very quickly over time. Initial perceived values immediately following an update may be directly correlated with present coding quality levels previously discussed. This direct relationship between a coding quality level and a time-dependent perceived value enables the temporal compensation of block progression based on mapping of compensated quality levels into a bandwidth analysis table as described by FIG. 16.

FIG. 19 shows a plot of perceived quality over time for an embodiment where it is acceptable to experience a high quality image that is obsolete even when the input has changed. In FIG. 19, line 1806 of FIG. 18 is replaced with lines 1842, 1844, 1846 and 1848 to remove the limitation in FIG. 18 that obsolete data starts at a perceived quality of 0. Plot 1842 shows a block at lossless perceived quality at time 0 when the input image changes. The perceived value drops to an initial positive value and then deteriorates over time. FIG. 19 shows that it may be more important to improve a poorly coded image then it is to start sending updates for an obsolete but lossless image.

Figure 20:
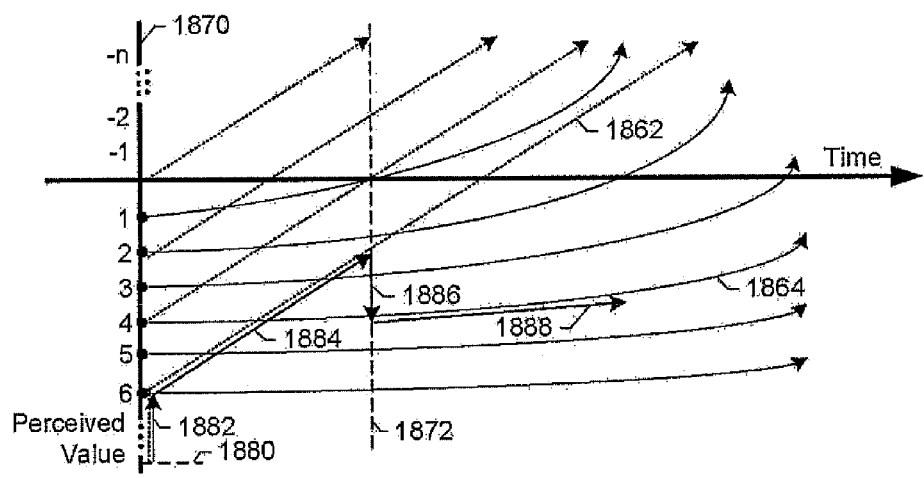
FIG. 20 shows an embodiment where an obsolete lossless image block is delayed before it is replaced with a changed input image block.

FIG. 20 shows an embodiment where an obsolete lossless image block is delayed before it is replaced with a changed input image block and plots a progression in perceived value from time 1870 for a block at lossless perceived quality 1880 when the input changes. As a first stage 1882 in the progression after the input changes, the block drops to a new perceived quality. In fact, the viewer may not perceive the obsolete status of the block at this time. As a next stage in the progression 1884, the perceived quality follows curve 1862 until time 1872. At time 1872, it is determined that it more valuable to use available bandwidth to encode the new content to perceived value of 4 than to allow further deterioration of the obsolete image. The changed input is encoded to a perceived value of 4 as stage 1886 shown. Finally, the changed input deteriorates as predicted by curve 1864 during stage 1888. Stage 1888 lasts until either the content is improved or a new changed input is encoded.

Figure 21:
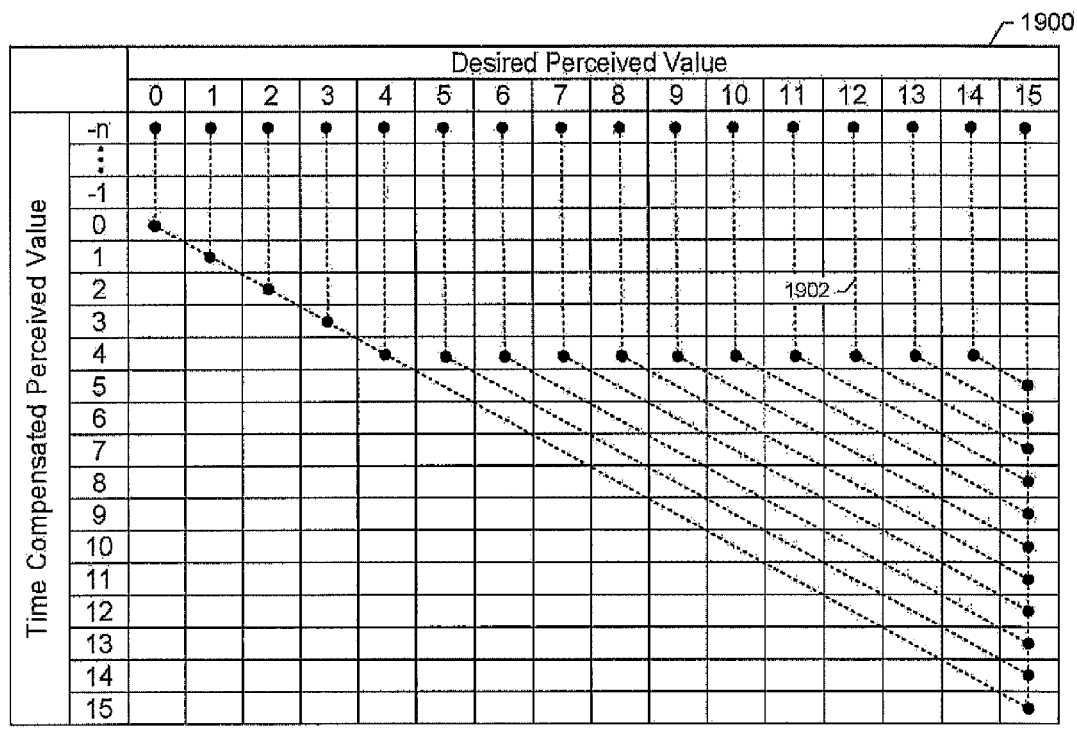
FIG. 21 shows a bandwidth analysis table with perceived value compensation.

FIG. 21 shows a bandwidth analysis table with perceived value compensation. A method for compensating for time dependent perceived quality is described by a variation on the method described by FIG. 5 in which step 500 includes a recording of the time (for example, in number of frames) each block remains at a build state and step 504 uses bandwidth analysis table 1900 in FIG. 21 as described below. Table 1900 enables the progression of blocks in a manner similar to the method used by table 1600 in FIG. 16. However, a perceived value compensation graph translates quality levels between a measurable coding quality domain as used in earlier embodiments of the present invention and a time-dependent perceived value domain used by table 1900. Target quality line 1902 in table 1900 is similar to target quality line 1608 described for FIG. 16, comprising three segments. However, the first vertical segment extends to an nth negative perceived quality value corresponding with an nth negative perceived quality value for the graph shown in FIG. 21.

State information including present coding quality level and time since last update is maintained for each block (as captured in step 500 in FIG. 5). During region analysis (step 504 in FIG. 5), a perceived value compensation table is used to retrieve an equivalent perceived value for each block in the region. In the present embodiment, a look-up table derived from the graph in FIG. 21 is used. In other embodiments, different perceptual value trends are used, each trend pertinent to the specific application of the embodiment. Translation between domains occurs as follows. As a first step, bandwidth estimates for target quality lines are calculated as described by step 940 in FIG. 9 and a desired perceived quality level for each block is determined. As a next step, a next coding level for each block is determined by mapping the perceived values back to real desired coding quality levels using a reverse table look up procedure. Note that perceived quality levels in FIG. 21 need to be quantized to integer perceived quality levels in embodiments where an encoder only supports integer coding quality levels.

While a method and apparatus for progressive block encoding using region analysis has been described and illustrated in detail, it is to be understood that many changes and modifications can be made to various embodiments of the present invention, without departing from the spirit thereof

What is claimed is:

1. A method of progressively encoding and transmitting visual data, comprising:
    acquiring image information updates for a region of visual data, the region of visual data defined by a plurality of blocks of pixel data, wherein individual blocks of the plurality are associated with individual change histories for their respective pixel data;
    retrieving stored region information for the region of visual data, the retrieved information including a recent encoded state for each block in the plurality;
    determining available network bandwidth;
    determining encoding parameters for each block in the region of visual data from the retrieved region information and the available network bandwidth;
    encoding the plurality of blocks;
    updating the retrieved region information in accordance with the determined encoding parameters; and
    transmitting the encoded blocks across a computer network, wherein determining encoding parameters comprises determining an initial encoding quality level for pixel values that have changed, and wherein determining encoding parameters comprises determining an incremental encoding quality level for blocks that have been previously encoded, have not reached a lossless encoded state and have unchanged pixel values.

2. The method of claim 1, wherein the stored region information comprises an image history for the region.

3. The method of claim 2, wherein the image history comprises an initialized encoding state for at least one block in the plurality.

4. The method of claim 2, wherein the image history comprises a history of encoding at least one block in the plurality since pixel data in the at least one block was changed.

5. The method of claim 2, wherein the image history comprises an indication of a number of frames that have been acquired since the most recent encoding.

6. The method of claim 2, wherein the image history comprises a record of the time since the most recent encoding.

7. The method of claim 2, wherein the image history comprises information describing image types contained within blocks in the plurality.

8. The method of claim 7, wherein the image types comprise selections from the group consisting of text, picture, background, video and object.

9. The method of claim 1, wherein the recent encoded state comprises the most recent progressive encoded state for the block.

10. The method of claim 1, wherein acquiring image information update comprises acquiring pixel updates for a block.

11. The method of claim 1, wherein acquiring image information update comprises acquiring image type information for a block.

12. The method of claim 11, wherein the image types comprise selections from the group consisting of text, picture, background, video and object.

13. The method of claim 1, wherein determining encoding parameters comprises determining block encoding requirements.

14. The method of claim 13, wherein the block encoding requirements comprises an incremental progressive encoding step.

15. The method of claim 13, wherein the block encoding requirements comprises an initial encoding quality level.

16. The method of claim 13, wherein the block encoding requirements comprises determining how a block is to be encoded.

17. The method of claim 16, wherein the block is encoded with at least one encoding method.

18. The method of claim 1, further comprising storing the updated region information.

19. The method of claim 18, wherein storing the updated region information comprises storing updated image content.

20. The method of claim 18, wherein storing the updated region information comprises storing a pixel mask for a block, the pixel mask indicating pixel data in the block that has been encoded.

21. The method of claim 1, wherein determining encoding parameters comprises generating a summary table.

22. The method of claim 21, wherein the summary table includes a sum of the number of blocks at each possible encoding state.

23. The method of claim 1, wherein acquiring image information comprises acquiring attributes, the attributes describing properties of the region, by applying a decomposition filter to the acquired image information.

24. The method of claim 1, wherein acquiring image information comprises acquiring a present encoding quality level for blocks in the plurality.

25. The method of claim 1, wherein acquiring image information comprises acquiring indicia that a block is being progressively encoded but pixel data within the progressively encoded block have not reached a lossless state.

26. The method of claim 1, wherein acquiring image information comprises identifying pixel data as being related to a video sequence, wherein encoding the plurality of blocks comprises performing video encoding on blocks in the plurality.

27. The method of claim 1, further comprising encoding all changed blocks within the region at a substantially similar encoding quality level.

28. The method of claim 1, wherein determining the incremental encoding quality level for each previously encoded block is determined such that all blocks complete their encoding at the substantially similar encoding quality level.

29. The method of claim 1, wherein determining the incremental encoding quality level for each previously encoded block is determined such that all blocks increment their encoding quality level in a perceptually similar encoding quality step size.

30. The method of claim 1, wherein determining the incremental encoding quality level for each previously encoded block is determined such that all blocks in the plurality are incremented to an encoding quality level that is inversely proportional to their respective current encoding quality level.

31. The method of claim 1, wherein determining the encoding quality level comprises accounting for a duration of time for which a block has remained associated with an encoding quality level.

32. The method of claim 1, wherein determining the encoding quality level comprises accounting for the time since the pixel data values have changed.

33. The method of claim 1, wherein determining the encoding quality level comprises determining a maximum encoding quality increment that can be achieved within the available network bandwidth.

34. Apparatus for progressively encoding and transmitting visual data, comprising:
- means for acquiring image information updates for a region of visual data, the region of visual data defined by a plurality of blocks of pixel data, wherein individual blocks of the plurality are associated with individual change histories for their respective pixel data;
- means for retrieving stored region information for the region of visual data, the retrieved information including a recent encoded state for each block in the plurality;
- means for determining available network bandwidth;
- means for determining encoding parameters for each block in the region of visual data from the retrieved region information and the available network bandwidth;
- means for encoding the plurality of blocks;
- means for updating the retrieved region information in accordance with the determined encoding parameters; and
- means for transmitting the encoded blocks across a computer network, wherein determining encoding parameters comprises determining an initial encoding quality level for pixel values that have changed, and wherein determining encoding parameters comprises determining an incremental encoding quality level for blocks that have been previously encoded, have not reached a lossless encoded state and have unchanged pixel values.

35. A non-transitory computer readable medium encoded with a computer program which, when executed by a computer, progressively encodes and transmits visual data, by:
- acquiring image information updates for a region of visual data, the region of visual data defined by a plurality of blocks of pixel data, wherein individual blocks of the plurality are associated with individual change histories for their respective pixel data;
- retrieving stored region information for the region of visual data, the retrieved information including a recent encoded state for each block in the plurality;
- determining available network bandwidth; determining encoding parameters for each block in the region of visual data from the retrieved region information and the available network bandwidth;
- encoding the plurality of blocks;
- updating the retrieved region information in accordance with the determined encoding parameters; and
- transmitting the encoded blocks across a computer network, wherein determining encoding parameters comprises determining an initial encoding quality level for pixel values that have changed, and wherein determining encoding parameters comprises determining an incremental encoding quality level for blocks that have been previously encoded, have not reached a lossless encoded state and have unchanged pixel values.

* * * * *